(12) United States Patent
Choi et al.

(10) Patent No.: US 10,254,915 B2
(45) Date of Patent: Apr. 9, 2019

(54) APPARATUS, METHOD, AND COMPUTER-READABLE RECORDING MEDIUM FOR DISPLAYING SHORTCUT ICON WINDOW

(71) Applicant: Samsung Electronics Co., Ltd., Gyeonggi-do (KR)

(72) Inventors: Seong-Hoon Choi, Seoul (KR); Seong-Il Shin, Gyeonggi-do (KR); Joong-Hwan Lim, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 1036 days.

(21) Appl. No.: 14/258,437

(22) Filed: Apr. 22, 2014

(65) Prior Publication Data

US 2014/0317555 A1 Oct. 23, 2014

(30) Foreign Application Priority Data

Apr. 22, 2013 (KR) .......................... 10-2013-0044192

(51) Int. Cl.
*G06F 3/048* (2013.01)
*G06F 3/0481* (2013.01)
*G06F 3/0482* (2013.01)
*G06F 3/0488* (2013.01)

(52) U.S. Cl.
CPC ........ *G06F 3/04817* (2013.01); *G06F 3/0482* (2013.01); *G06F 3/04883* (2013.01); *G06F 2203/04808* (2013.01)

(58) Field of Classification Search
None
See application file for complete search history.

(56) References Cited

U.S. PATENT DOCUMENTS

| 4,931,783 A * | 6/1990 | Atkinson | G06F 3/0482 |
| | | | 345/163 |
| 6,232,972 B1 * | 5/2001 | Arcuri | G06F 3/0482 |
| | | | 715/815 |
| 9,513,710 B2 * | 12/2016 | Lee | G06F 3/017 |
| 2003/0164862 A1 * | 9/2003 | Cadiz | G06Q 10/107 |
| | | | 715/838 |

(Continued)

FOREIGN PATENT DOCUMENTS

| KR | 100722473 | 5/2007 |
| KR | 20070107443 | 11/2007 |
| KR | 1020120026072 | 3/2012 |

OTHER PUBLICATIONS

ProKitchen: https://www.youtube.com/watch?v=buuZ--9LN44, Moving Vertical Panel and Toolbar, Dec 17, 2010.*

(Continued)

*Primary Examiner* — Hua Lu
(74) *Attorney, Agent, or Firm* — The Farrell Law Firm, P.C.

(57) ABSTRACT

An apparatus for displaying a shortcut icon window of a mobile device includes: a display unit that displays a first layer including a plurality of first shortcut icons for executing different applications and a second layer including a shortcut icon window having one or more second shortcut icons, the second layer being located on the first layer; and a controller that, when at least one of the first shortcut icons is selected, controls to display the shortcut icon window on an execution screen of an application corresponding to the selected at least one first shortcut icon.

16 Claims, 21 Drawing Sheets

(56) References Cited

U.S. PATENT DOCUMENTS

| | | | | |
|---|---|---|---|---|
| 2004/0160463 A1* | 8/2004 | Battles | G06F 3/0482 | 715/814 |
| 2006/0242557 A1* | 10/2006 | Nortis, III | G06F 3/0482 | 715/234 |
| 2007/0250793 A1* | 10/2007 | Miura | G06F 3/0482 | 715/810 |
| 2008/0222569 A1* | 9/2008 | Champion | G06F 3/0482 | 715/834 |
| 2009/0228831 A1* | 9/2009 | Wendker | G06F 3/0482 | 715/808 |
| 2010/0162108 A1* | 6/2010 | Stallings | G06F 3/04817 | 715/702 |
| 2010/0306714 A1 | 12/2010 | Latta et al. | | |
| 2011/0264996 A1* | 10/2011 | Norris, III | G06F 3/0482 | 715/236 |
| 2012/0060089 A1* | 3/2012 | Heo | G06F 1/1647 | 715/702 |
| 2012/0098639 A1* | 4/2012 | Ijas | G06F 3/04883 | 340/5.51 |
| 2012/0179997 A1* | 7/2012 | Miyazaki | G06F 3/04842 | 715/830 |
| 2013/0019203 A1* | 1/2013 | Kotler | G06F 3/04812 | 715/811 |
| 2013/0036384 A1* | 2/2013 | Murata | G06F 3/0482 | 715/815 |
| 2013/0036387 A1* | 2/2013 | Murata | G06F 3/04883 | 715/841 |
| 2013/0145321 A1* | 6/2013 | Horiuchi | G06F 3/0483 | 715/830 |
| 2013/0162569 A1* | 6/2013 | Sudo | G06F 3/04845 | 345/173 |
| 2013/0298055 A1* | 11/2013 | Kao | G06F 3/0483 | 715/765 |
| 2014/0039871 A1* | 2/2014 | Crawford | G06F 17/211 | 704/2 |
| 2014/0051482 A1* | 2/2014 | Makiguchi | G06F 3/0487 | 455/566 |
| 2014/0052763 A1* | 2/2014 | Sato | G06F 3/0488 | 707/805 |
| 2014/0082495 A1* | 3/2014 | Estes | G06F 3/0482 | 715/716 |
| 2014/0082557 A1* | 3/2014 | Warner | G06F 3/04817 | 715/834 |
| 2014/0085237 A1* | 3/2014 | Choi | G06F 3/04883 | 345/173 |
| 2014/0145967 A1* | 5/2014 | Edwards | G06F 1/1628 | 345/173 |
| 2014/0267416 A1* | 9/2014 | Douris | G01C 21/3602 | 345/633 |
| 2014/0281882 A1* | 9/2014 | Scoda | G06F 17/30902 | 715/234 |
| 2014/0298276 A1* | 10/2014 | Yokoyama | G06F 3/04817 | 715/863 |
| 2015/0035772 A1* | 2/2015 | Asahara | B63B 49/00 | 345/173 |
| 2015/0128064 A1* | 5/2015 | Fleming | G06F 9/541 | 715/744 |
| 2015/0269754 A1* | 9/2015 | Fleming | G06F 9/541 | 345/676 |
| 2015/0350401 A1* | 12/2015 | Nishioka | H04M 1/72513 | 455/426.1 |
| 2015/0363049 A1* | 12/2015 | Sadouski | G06F 3/0482 | 345/173 |
| 2016/0077702 A1* | 3/2016 | Nomachi | G06F 3/0488 | 345/173 |
| 2016/0202884 A1* | 7/2016 | Ohki | G06F 3/04883 | 715/784 |

OTHER PUBLICATIONS

Alspach: Visual Quickstart Guide PDF with Acrobat 5 (2002).*
https://www.youtube.com/watch?v=IATHyPXYPEc, How to Setup / Create Folders & Group Apps on Samsung Galaxy S3 (SIII, i9300) Published on Jun 8, 2012 (Ghafoor).*

* cited by examiner

APPARATUS, METHOD, AND COMPUTER-READABLE RECORDING MEDIUM FOR DISPLAYING SHORTCUT ICON WINDOW

PRIORITY

This application claims priority under 35 U.S.C. § 119(a) to Korean Application Serial No. 10-2013-0044192, which was filed in the Korean Intellectual Property Office on Apr. 22, 2013, the entire content of which is hereby incorporated by reference.

BACKGROUND

1. Field of the Invention

The present disclosure generally relates to an operation of a shortcut icon window, and more particularly, to a method and an apparatus for displaying a shortcut icon window.

2. Description of the Related Art

The widespread distribution of the Internet has brought about the rapid development of wireless mobile communication technologies beyond that of wired communication technologies. In everyday life, searching for information on the Internet through portable terminals such as a smart phone, a Personal Digital Assistant (PDA), a hand-held computer, and the like has become possible without regard to time and place.

Various types of application programs which can provide all sorts of functions through Internet access are installed in all sorts of wired/wireless portable terminals which can access the Internet. Meanwhile, a large number of applications may be stored within each portable terminal. Further, shortcut icons for executing the applications are displayed on a display unit of the portable terminal. For example, a plurality of shortcut icons corresponding to applications installed in the portable terminal are displayed on the display unit and a user can execute a desired application in the portable terminal by selecting one of the shortcut icons.

In addition to the shortcut icons, various forms of visual objects, such as a widget, a picture, a document and the like, are displayed on the display unit of the portable terminal.

However, whenever an application is additionally installed by a user a shortcut icon corresponding to the added application is additionally displayed on the display unit. For example, in order to execute a desired application in the portable terminal storing a plurality of applications, the user is required to first find a shortcut icon corresponding to the desired application on the display unit of the portable terminal.

Due to a characteristic of the display unit of the portable terminal, a number of shortcut icons which can be displayed on one screen having a limited size is restricted. This is because the shortcut icon has a predetermined size to allow the user to recognize and read the shortcut icon. Accordingly, as a number of applications additionally installed in the portable terminal increases, it takes more time to find a shortcut icon corresponding to an application to be executed by the user. For this reason, a method in which the user can execute a desired application in the portable terminal through a simple operation is required.

SUMMARY

The present has been made to address the above problems and disadvantages, and to provide at least the advantages described below.

Accordingly, an aspect of the present disclosure provides an apparatus, a method, and a computer-readable recording medium for displaying a shortcut icon window through which a user can execute a desired application by a simple user input.

Another aspect of the present disclosure provides an apparatus, a method, and a computer-readable recording medium in which, even while an application is currently executed, another application different from the application can be executed by a simple user input.

Another aspect of the present disclosure, it is possible to reduce a time spent when the user attempts to find a shortcut icon corresponding to the application to be executed.

In accordance with an aspect of the present disclosure, an apparatus for displaying a shortcut icon window is provided. The apparatus includes a display unit that displays a first layer including a plurality of first shortcut icons for executing different applications and a second layer including a shortcut icon window having one or more second shortcut icons, the second layer being located on the first layer; and a controller that, when at least one of the first shortcut icons is selected, displays the shortcut icon window on an execution screen of an application corresponding to the selected at least one first shortcut icon.

In accordance with another aspect of the present disclosure, a method of displaying a shortcut icon window is provided. The method includes displaying a first layer including a plurality of first shortcut icons for executing different applications and a second layer including a shortcut icon window having one or more second shortcut icons on a display unit, the second layer being located on the first layer; and when at least one of the first shortcut icons is selected, displaying the shortcut icon window on an execution screen of an application corresponding to the selected at least one first shortcut icon.

In accordance with another aspect of the present disclosure, a computer-readable recording medium is provided for performing a method of displaying a shortcut icon window. The method includes displaying a first layer including a plurality of first shortcut icons for executing different applications and a second layer including a shortcut icon window having one or more second shortcut icons on a display unit, the second layer being located on the first layer; and when at least one of the first shortcut icons is selected, displaying the shortcut icon window on an execution screen of an application corresponding to the selected at least one first shortcut icon. According to another aspect of the present disclosure, a portable terminal for displaying a shortcut icon window is provided. The portable terminal includes a memory for storing a plurality of applications; a touch screen configured to a display a first layer including a plurality of first short cut icons for executing different applications of the plurality of applications, and a second layer including a shortcut icon window having one or more second shortcut icons, the second layer being located on the first layer; and a touch screen controller configured to display the shortcut icon window on an execution screen of an application corresponding to a selected icon of the plurality of first shortcut icons.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
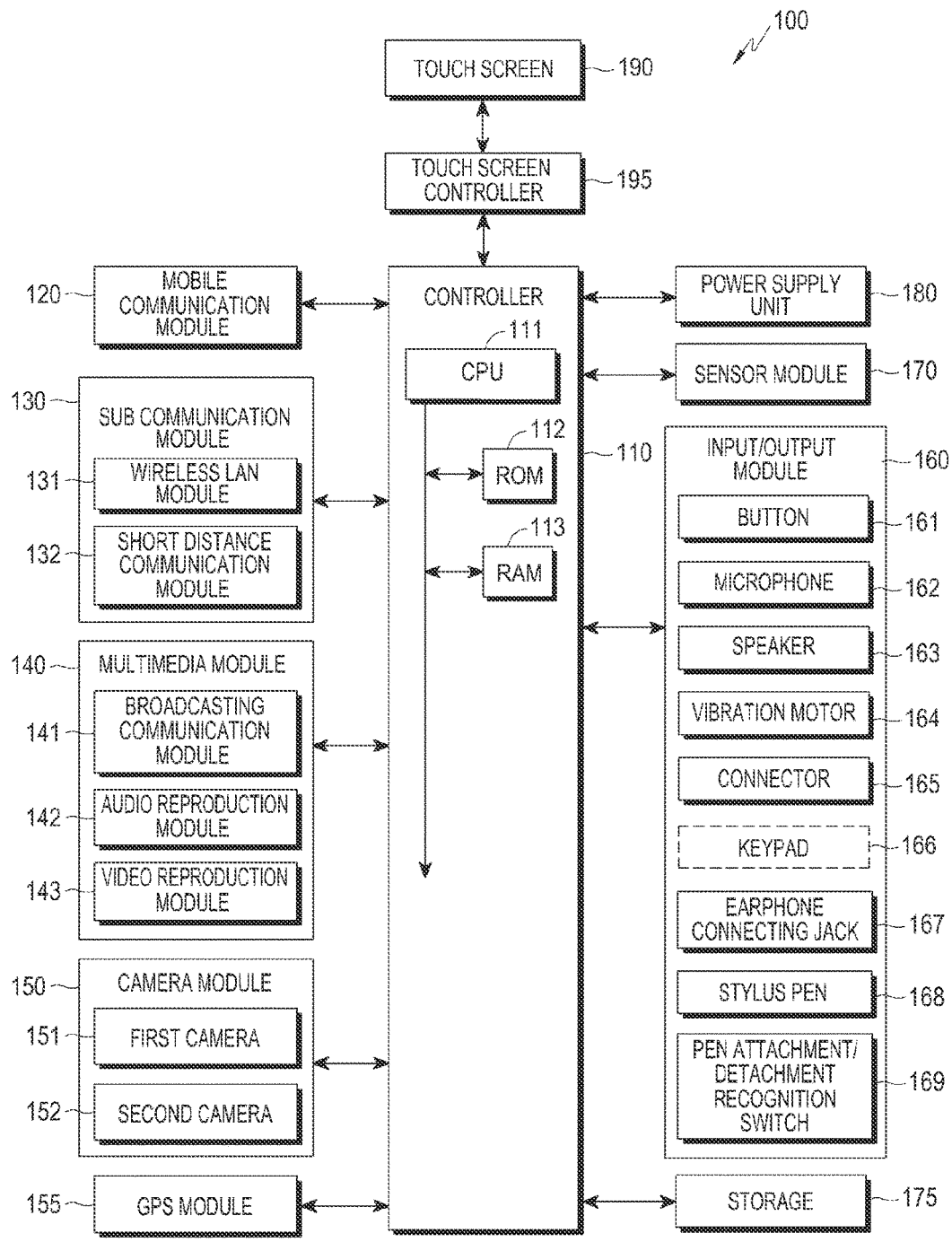
FIG. 1 is a block diagram schematically illustrating an example of a portable terminal as an electronic device according an embodiment of the present disclosure.

Hereinafter, embodiments according to the present disclosure will be described in detail with reference to the accompanying drawings. However, the present disclosure is not restricted by the described embodiments, and is not limited to the embodiments. The same reference numerals represented in each of the drawings indicate elements that perform substantially the same functions.

Although the terms including an ordinal number such as first, second, etc. can be used for describing various elements, the elements are not restricted by the terms. The terms are only used to distinguish one element from another element. For example, without departing from the scope of the present disclosure, a first structural element may be referred to as a second structural named. Similarly, the second structural element also may be referred to as the first structural element. The terms used in this application are for the purpose of describing particular embodiments only and is not intended to limit the disclosure. Singular forms are intended to include plural forms unless the context clearly indicates otherwise.

The terms used herein have been selected in consideration of functions in the present disclosure and among the terms which are most widely used at the present time. However, the terms may be changed according to an intention of a technician who works in this field, a precedent, an appearance of a new technology, or the like. In addition, in certain cases, a term arbitrarily selected may also be used. In such a case, the meaning of the term will be described in detail at the corresponding part in the description of the present disclosure. Thus, a term used herein should be defined based on the meaning of the term and the entire contents of the present specification rather than merely on the name expressed by the term. In the entire specification of the present application, when it is described that a certain unit "includes" a certain element, this means that the unit may include any other element rather than exclude the any other element unless otherwise described. In addition, the term, "unit", "module" or the like used herein means a unit that processes at least one function or operation and may be implemented by a combination of hardware and software.

Terms used herein will be briefly explained and then the present disclosure will be described in detail.

A "shortcut icon window displaying apparatus" according to an embodiment of the present disclosure may be a separately configured electronic device or a part included in a particular electronic device in a hardware or software form. Further, the shortcut icon window displaying apparatus may be implemented in the form of a program interworking with an application installed in an electronic device or in the form of a program as a function included within the application. Accordingly, an electronic device including a shortcut icon window displaying apparatus according to an embodiment of the present disclosure may be a predetermined device including, for example, a touch screen, and may be included in a portable terminal, a mobile terminal, a communication terminal, a portable communication terminal, a portable mobile terminal, or the like. For example, the electronic device may be a smart phone, a mobile phone, a game player, a TeleVision (TV), a display device, a head unit for a vehicle, a notebook computer, a laptop computer, a tablet computer, a Personal Media Player (PMP), a Personal Digital Assistant (PDA), a navigation device, an Automatic Teller Machine (ATM) for banking, a Point-Of-Sale (POS) device for a store, and the like. Further, the electronic device may be a flexible device or a flexible display device.

For example, the shortcut icon window displaying apparatus according to an embodiment of the present disclosure is a portable and movable device which can perform data transmission/reception and a voice and video call, and may include at least one display unit (for example, a touch screen).

An "application" refers to a set of a series of computer programs designed to perform particular functions. Various applications may be described in this specification. For example, a mail application, a camera application, and the like, may be described, but the present disclosure is not limited thereto.

A "shortcut icon" is displayed on a first layer of the display unit of the portable terminal to quickly execute each application, or a call, a contact, or a menu basically provided in the portable terminal. When an instruction for executing the shortcut icon is input, the corresponding application may be executed.

A "shortcut icon window" may have one or more shortcut icons and may be displayed on a second layer (a higher layer than the first layer) of the display unit of the portable terminal. When a user input for executing the shortcut icon is input, the corresponding application may be executed. The shortcut icon and the shortcut icon window may be displayed on the display unit of the portable terminal in various forms, such as a drawing, a figure, a symbol and the like.

The "user input" provides an instruction or an input of the portable terminal and includes a gesture, a voice, a pupil action, and a bio signal of the user.

A "user input unit" is a unit for the user input and includes at least one of a finger, an electronic pen, a stylus pen, and the like, which can provide an instruction or an input of the portable terminal even in a noncontact state, such as hovering, as well as a contact on the display unit of the portable terminal.

An "object" is something which is displayed or can be displayed on the display unit of the portable terminal. The object may include at least one of a shortcut icon corresponding to an application, a document, a widget, a picture, a map, a dynamic image, an e-mail, an Short Message Service (SMS) message, and a Multimedia Messaging Service (MMS) message and may be executed, deleted, canceled, stored, and changed by the user input. The object may include a shortcut icon window and a folder which store a shortcut icon, a thumbnail image, and one or more objects in a mobile device.

A "user gesture" refers to an input controlling one or more objects displayed on the display unit of the portable terminal and includes a single touch gesture, a multi-touch gesture, and a flick gesture.

The "single touch gesture" is a gesture by which an object displayed on the display unit of the electronic device is selected according to a user gesture input, and then the electronic device may execute an application corresponding to the selected object.

For example, when an electronic user input unit touches the display unit of the electronic device within a predetermined time, an application corresponding to an object in a touched position may be executed. At this time, when the user input unit continuously moves in one direction while the touch is maintained, the object may move along the movement direction and is finally located at a position where the touch ends.

The "multi-touch gesture" is a gesture of selecting at least two positions on the display unit of the electronic device to allow the electronic device to perform an operation corresponding to movements of the selected positions in a state where the touches of the selected positions are maintained. For example, the multi-touch gesture may include a case where multiple touches are made within sizes of a plurality of objects, respectively, by the multi touch gesture and a case where the multiple touches select at least two of sub objects included in the object by the multi touch gesture.

In the case where the multiple touches are made within the plurality of objects, respectively, by the multi touch gesture, the objects are continuously moved in one direction of the multi touch gesture in a state where the touches of the objects are maintained, and positions of the selected objects are finally moved to current touch coordinates along the movement direction.

Further, each of the plurality of objects are selected within a size thereof by the multi touch gesture, the plurality of objects may be combined into one object while moving, and the one combined object may be moved to a center coordinate of coordinates of the objects selected by the multi touch gesture.

When at least two positions are selected within a size of the object by the multi touch gesture and the selected two positions move apart from each other, the object may be split into sub objects, and may be moved in different directions and displayed on the display unit of the electronic device. The split may be made based on a center axis of a boundary of the sub objects included in the object. Further, the split may be made based on a center coordinate of the at least two positions selected by the multi touch gesture.

When at least two positions are selected within a size of the object by the multi touch gesture and the selected two positions move closer to each other, the object may be displayed as an object having a shape smaller than the object.

The "flick gesture" may be a user gesture of selecting an object displayed on the display unit of the electronic device by using the user input unit and continuously moving the user input unit in one direction in a state where the selected object is touched by the user input unit. As a result, the object is moved to a position where a final touch ends along the movement direction. The flick gesture may be faster than the drag by the single touch gesture and may have an angular speed. The flick gesture and the drag by the single touch gesture may be determined by the electronic device according to an embodiment of the present disclosure based on a distance between a current touch coordinate and a just previously recognized touch coordinate, an angular speed, and the like. For example, the drag and the flick gesture may be distinguished by comparing a difference between the current touch coordinate and the just previously recognized touch coordinate with a predetermined reference value.

Hereinafter, a mobile device according to an embodiment of the present disclosure will be described.

FIG. 1 is a block diagram schematically illustrating an example of a portable terminal as an electronic device according an embodiment of the present disclosure.

Referring to FIG. 1, a portable terminal 100 can be connected with an external device (not shown) by using an external device connector such as a sub communication module 130, a connector 165, and an earphone connecting jack 167. The "external device" may include various devices attached to or detached from the portable terminal 100 through a cable, such as an earphone, an external speaker, a Universal Serial Bus (USB) memory, a charger, a cradle/ dock, a DMB antenna, a mobile payment related device, a health management device (a blood sugar tester or the like), a game machine, a car navigation device, and the like. Further, the "external device" may include one of a short-range communication unit such as a Bluetooth communication unit, a Near Field Communication (NFC) unit and a Wi-Fi direct communication device, and a wireless Access Point (AP), which are wirelessly connected to the portable device 100 via short-range communication. In addition, the "external device" may include other devices, such as a portable phone, a smart phone, a tablet PC, a desktop PC and a server.

The portable terminal 100 includes a display unit, such as touch screen 190 and a display controller, such as touch screen controller 195. Also, the portable terminal 100 includes a controller 110, a mobile communication module 120, sub communication module 130, a multimedia module 140, a camera module 150, a Global Positioning System (GPS) module 155, an input/output module 160, a sensor module 170, a storage unit 175, and a power supply unit 180.

The sub-communication module 130 includes at least one of a Wireless Local Area Network (WLAN) module 131 and a short range communication module 132, and the multimedia module 140 includes at least one of a broadcasting communication module 141, an audio reproduction module 142, and a video reproduction module 143.

The camera module 150 includes at least one of a first camera 151 and a second camera 152. The input/output module 160 includes at least one of a button 161, a microphone 162, a speaker 163, a vibration motor 164, a connector 165, a keypad 166, an earphone connecting jack 167, a stylus pen 168, and a recognition switch 169.

Hereinafter, descriptions will be made as to a case where the display unit 190 and the display controller 195 are a touch screen and a touch screen controller, respectively, by way of an example.

The controller 110 includes a Central Processing Unit (CPU) 111, a Read-Only Memory (ROM) 112 which stores a control program for controlling the apparatus 100, and a Random Access Memory (RAM) 113 which stores signals or data input from the outside of the portable terminal 100, or is used as a storage region for operations performed by the portable terminal 100. The CPU 111 may include a single core, a dual core, a triple core, or a quadruple core. The CPU 111, the ROM 112 and the RAM 113 may be connected to each other through internal buses.

The controller 110 controls the mobile communication module 120, the sub-communication module 130, the multimedia module 140, the camera module 150, the GPS module 155, the input/output module 160, the sensor module 170, the storage unit 175, the power supply unit 180, the touch screen 190, and the touch screen controller 195.

The mobile communication module 120 enables the portable terminal 100 to be connected with an external device through mobile communication by using one antenna or a plurality of antennas under the control of the controller 110. The mobile communication module 120 transmits/receives a wireless signal for a voice call, a video call, a Short Message Service (SMS), or a Multimedia Message Service (MMS) to/from a mobile phone, a smart phone, a tablet PC, or another device, which has a phone number input into the portable terminal 100.

The sub-communication module 130 includes at least one of the WLAN module 131 and the short-range communication module 132. For example, the sub-communication module 130 may include only the WLAN module 131, only the short-range communication module 132, or both the WLAN module 131 and the short-range communication module 132.

The WLAN module 131 may be connected to the Internet in a place where a wireless Access Point (AP) is installed, under a control of the controller 110. The WLAN module 131 supports a WLAN standard (IEEE802.11x) of the Institute of Electrical and Electronics Engineers (IEEE). The short-range communication module 132 wirelessly performs short-range communication between the portable terminal 100 and an image forming device under a control of the controller 110. A short-range communication scheme may include a Bluetooth communication scheme, an Infrared Data Association (IrDA) communication scheme, a WiFi-Direct communication scheme, a Near Field Communication (NFC) scheme, and the like.

The portable terminal 100 may include at least one of the mobile communication module 120, the WLAN module 131, and the short range communication module 132 according to a capability thereof. For example, the mobile terminal 100 may include a combination of the mobile communication module 120, the WLAN module 131, and the short range communication module 132 according to the capability thereof.

The multimedia module 140 includes the broadcasting communication module 141, the audio reproduction module 142 and the video reproduction module 143. The broadcasting communication module 141 receives a broadcasting signal (e.g., a TV broadcasting signal, a radio broadcasting signal or a data broadcasting signal) or broadcasting additional information (e.g., Electric Program Guide (EPS) or Electric Service Guide (ESG)) which are transmitted from a broadcasting station, through a broadcasting communication antenna, under the control of the controller 110. The audio reproduction module 142 reproduces a stored or received digital audio file, e.g., a file having a file extension of mp3, wma, ogg, or way, under a control of the controller 110. The video reproduction module 143 reproduces a stored or received digital video file (e.g., a file of which the file extension is mpeg, mpg, mp4, avi, mov, or mkv) under the control of the controller 110. The video reproduction module 143 may reproduce a digital audio file.

The multimedia module 140 may include the audio reproduction module 142 and the video reproduction module 143 without including the broadcasting communication module 141. Further, the audio reproduction module 142 or the video reproduction module 143 of the multimedia module 140 may be included in the controller 110.

The camera module 150 may include at least one of the first camera 151 and the second camera 152 which photograph a still image or a moving image under the control of the controller 110. Further, the first camera 151 or the second camera 152 may include an auxiliary light source (e.g., a flash) that provides an amount of light required for photographing. The first camera 151 may be disposed on a front side of the portable terminal 100, and the second camera 152 may be disposed on a back side of the portable terminal 100. Alternatively, the first camera 151 and the second camera 152 may be located adjacent to each other (e.g., an interval between the first camera 151 and the second camera 152 is larger than 1 cm and smaller than 8 cm) to photograph a three-dimensional still image or a three-dimensional moving image.

The GPS module 155 receives radio waves from a plurality of GPS satellites in the Earth's orbit and calculates a position of the mobile terminal 100 by using Time of Arrival information from the GPS satellites to the portable terminal 100.

The input/output module 160 includes at least one of a plurality of buttons 161, a microphone 162, a speaker 163, a vibration motor 164, a connector 165, a keypad 166, an earphone connecting jack 167, a stylus pen 168, and a recognition switch 169. The buttons 161 may be formed on a front surface, a side surface, or a rear surface of the housing of the portable terminal 100, and may include at least one of a power/lock button, a volume button, a menu button, a home button, a back button, and a search button.

The microphone 162 receives a voice or a sound to generate an electrical signal under the control of the controller 110. The speaker 163 outputs sounds corresponding to various signals of the mobile communication module 120, the sub-communication module 130, the multimedia module 140, and the camera module 150 (e.g., a radio signal, a broadcast signal, a digital audio file, a digital video file, or photographing) to the outside of the mobile terminal 100 under the control of the portable terminal 110. The speaker 163 may also output a sound (for example, a button tone corresponding to phone communication or a ring tone) corresponding to a function performed by the portable terminal 100. One or more speakers 163 may be formed at a proper position or positions of the housing of the portable terminal 100.

According to the control of the controller 110, the vibration motor 164 converts an electrical signal into a mechanical vibration. For example, when the portable terminal 100 in a vibration mode receives a voice call from any other device (the vibration motor 164 operates. One or more vibration motors 164 may be provided in the housing of the portable terminal 100. The vibration motor 164 may also operate in response to a touch operation of a user who touches the touch screen 190, and a continuous movement of a touch on the touch screen 190.

The connector 165 may be used as an interface for connecting the portable terminal 100 and an external device, the portable terminal 100 and a power source.

The portable terminal 100 transmits or receives data stored in the storage unit 175 of the portable terminal 100 to or from an external device through a wired cable connected to the connector 165 according to a control of the controller 110. Further, the portable terminal 100 may receive power from the power source through the wired cable connected to the connector 165 or charge a battery by using the power source.

The keypad 166 receives a key input from a user for control of the portable terminal 100. The keypad 166 includes a physical keypad formed in the portable terminal 100 or a virtual keypad displayed on the touch screen 190. The physical keypad formed on the portable terminal 100 may be omitted according to the capability or configuration of the portable terminal 100.

An earphone is inserted into the earphone connecting jack 167 to be connected with portable terminal 100.

The sensor module 170 includes at least one sensor for detecting a state of the portable terminal 100. For example, the sensor module 170 may include a proximity sensor that detects a user's proximity to the portable terminal 100, an illumination sensor that detects a quantity of light around the portable terminal 100, a motion sensor that detects a motion (e.g., rotation of the portable terminal 100 and acceleration or a vibration applied to the portable terminal 100) of the portable terminal 100, a geo-magnetic sensor that detects a point of a compass by using the Earth's magnetic field, a gravity sensor that detects an action direction of gravity, and an altimeter that detects an altitude through measuring an atmospheric pressure. At least one sensor may detect the state, and may generate a signal corresponding to the detection to transmit the generated signal to the controller 110. The sensors of the sensor module 170 may be added or omitted according to a capability of the portable terminal 100.

The storage unit 175 stores signals or data which corresponding to input/output of an operation of the mobile communication module 120, the sub-communication module 130, the multimedia module 140, the camera module 150, the GPS module 155, the input/output module 160, the sensor module 170, and the touch screen 190 under the control of the controller 110. The storage unit 175 can store a control program and applications for controlling the portable terminal 100 or the controller 110

The term "storage unit" as used herein refers to a random data storage device such as the storage unit 175, the ROM 112 and the RAM 113 within the controller 110, or a memory card mounted on the portable terminal 100 (e.g., a Secure Digital (SD) card or a memory stick). The storage unit 175 may include a non-volatile memory, a volatile memory, a Hard Disk Drive (HDD) or a Solid State Drive (SSD).

The power supply unit 180 supplies power to one battery or a plurality of batteries arranged at the portable terminal 100 according to a control of the controller 110. The one or more batteries supply power to the portable terminal 100. In addition, the power supply unit 180 supplies, to the portable terminal 100, the power input from an external power source through a wired cable connected with the connector 165. In addition, the power supply unit 180 supplies power wirelessly input from the external power source through a wireless charging technology to the portable terminal 100.

The touch screen 190 provides a user with a User Interface (UI) corresponding to various services (e.g., a voice call, data transmission, broadcasting, and photographing). The touch screen 190 transmits an analog signal corresponding to at least one touch, which is input to the UI, to the touch screen controller 195. The touch screen 190 receives at least one touch as input from the user's body part (e.g., a finger) or an input means (e.g., a stylus pen 168) enabling a touch. Also, the touch screen 190 may receive, as input, a continuous movement of one touch. The touch screen 190 transmits an analog signal corresponding to a continuous movement of an input touch to the touch screen controller 195.

The touch according to the present disclosure is not limited to the contact between the display unit 190 and the user's body or the touchable input means, and may include a non-contact (for example, a detectable interval between the display unit 190 and the user's body or the touchable input means is less than or equal to 1 mm) The detectable interval on the display unit 190 may be changed according to a capability or a structure of the portable terminal 100. Particularly, the display unit 190 may output different values (for example, including current values) detected by a touch event and a hovering event to distinguish the touch event by a contact with the user's body or the touchable input unit and the non-contact input event. Further, it is preferable that the screen 190 differently outputs detected values (for example, a current value or the like) according to a distance between a space where the hovering event is generated and the screen 190.

The touch screen 190, for example, may be implemented in a resistive type, a capacitive type, an infrared type, or an acoustic wave type.

Meanwhile, the touch screen controller 195 converts an analog signal received from the touch screen 190 into a digital signal, i.e. X and Y coordinates, and transmits the digital signal to the controller 110. The controller 110 controls the touch screen 195 by using the digital signal received from the touch screen controller 190. For example, the controller 110 allows a shortcut icon displayed on the touch screen 190 to be selected or executed in response to the touch event or the hovering event. Further, the touch screen controller 195 may be included in the controller 110.

Furthermore, the touch screen controller 195 identifies a distance between a space where the hovering event is generated and the display unit 190 by detecting a value (for example, a current value or the like) output through the display unit 190, converts the identified distance value to a digital signal (for example, a Z coordinate), and then provides the converted digital signal to the controller 110.

Further, the touch screen 190 may include at least two touch screen panels which detect a touch or an approach of a user's body part or a touch input means in order to simultaneously receive inputs of the user's body part and the touchable input means. The at least two touch screen panels provide different output values to the touch screen controller 195, and the touch screen controller 195 differently recognizes the values input from the at least two touch screen panels to determine whether the input from the touch screen is an input by the user's body part or an input by the touch input means.

Further, the controller 110 detects various user inputs received through the camera module 150, the input/output module 160, and the sensor module 170, in addition to the touch screen 190. The user input may include various types of information input to the portable terminal 100, such as a gesture, a voice, a pupil action, and a bio signal of the user, as well as the touch. The controller 110 controls the portable terminal 100 to perform a predetermined operation or function corresponding to the detected user input.

Figure 2:
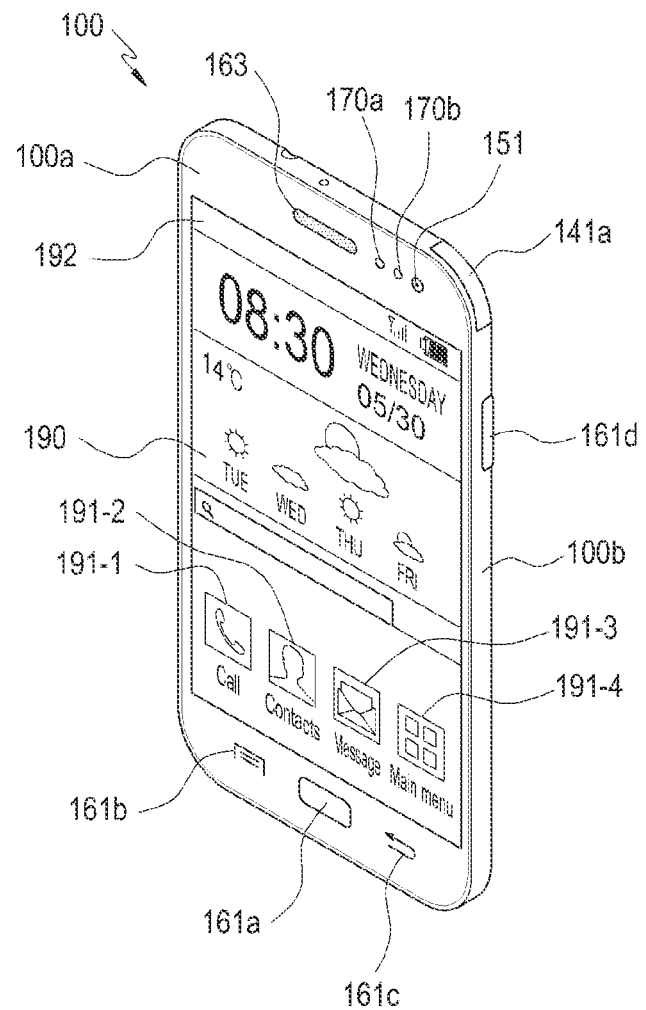
FIG. 2 is a front perspective view of a portable terminal according to an embodiment of the present disclosure.
Figure 3:
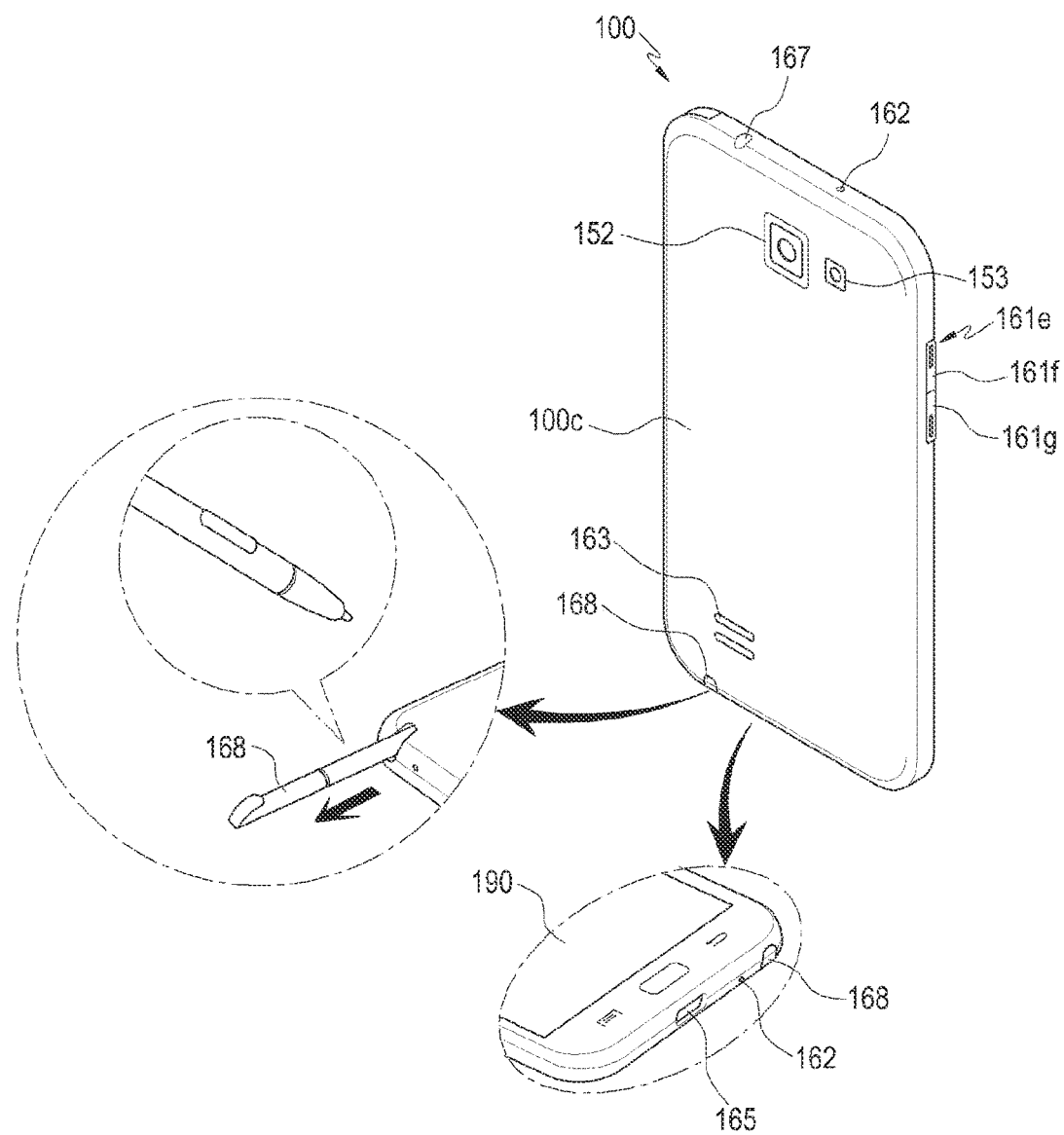
FIG. 3 is a rear perspective view of a portable terminal according to an embodiment of the present disclosure.

FIG. 2 is a front perspective view of the portable terminal according to an embodiment of the present disclosure. FIG. 3 is a rear perspective view of the portable terminal according to an embodiment of the present disclosure.

Referring to FIGS. 2 and 3, the touch screen 190 is disposed in a center of a front surface 100*a* of the portable terminal 100. The touch screen 190 has a large size to occupy most of a front surface 100*a* of the portable terminal 100.

FIG. 2 illustrates an example in which a main home screen is displayed on the touch screen 190. The main home screen is a first screen displayed on the touch screen 190 when the portable terminal 100 is turned on.

Further, when the portable terminal 100 has several pages of different home screens, the main home screen may be the first home screen of the several pages of the home screens. Short-cut icons 191-1, 191-2, and 191-3 for executing frequently used applications, a main menu switching key 191-4, time, weather and the like may be displayed on the home screen. The main menu switching key 191-4 displays a menu screen on the touch screen 190.

Further, a status bar 192 which displays the status of the portable terminal 100 such as a battery charging status, a received signal intensity, and a current time may be formed on an upper end of the touch screen 190.

A home button 161*a*, a menu button 161*b*, and a back button 161*c* may be formed at the lower part of the touch screen 190.

The home button 161*a* displays the main home screen on the touch screen 190. For example, when the home button 161*a* is pressed in a state where any home screen different from the main home screen or the menu screen is displayed on the touch screen 190, the main home screen may be displayed on the touch screen 190. That is, when the home button 191*a* is touched while applications are executed on the touch screen 190, the main home screen shown in FIG. 2 may be displayed on the touch screen 190. In addition, the home button 161*a* may be used to display recently used applications or a task manager on the touch screen 190.

The menu button 161*b* provides a connection menu which can be used on the touch screen 190. The connection menu may include a widget addition menu, a background changing menu, a search menu, an editing menu, an environment setup menu and the like. The back button 161*c* can be used for displaying the screen which was executed just before the currently executed screen or terminating the most recently used application.

The first camera 151, an illumination sensor 170*a*, and a proximity sensor 170*b* may be disposed on edges of the front side 100*a* of the portable terminal 100. The second camera 152, a flash 153, and the speaker 163 may be disposed on a rear surface 100*c* of the portable terminal 100.

A power/reset button 160*a*, a volume button 161*b*, a terrestrial DMB antenna 141*a* for reception of a broadcast, and one or more microphones 162 may be disposed on a side surface 100*b* of the portable terminal 100. The DMB antenna 141*a* may be formed to be fixedly or detachably mounted on the portable terminal 100.

Further, the portable terminal 100 has the connector 165 arranged on a lower side surface thereof. A plurality of electrodes are formed in the connector 165, and the connector 165 may be connected to an external device through a wire. The earphone connecting jack 167 may be formed on an upper side surface of the portable terminal 100. Earphones may be inserted into the earphone connecting jack 167.

Further, a stylus pen 168 may be formed in a lower side surface of the portable terminal 100. The stylus pen 168 may be stored while being inserted into the portable terminal and may be withdrawn and removable from the portable terminal 100 when being used. In addition, a pen attachment/detachment recognition switch 169 operating in accordance with attachment and detachment of the stylus pen 168 is contained in one area within the portable terminal 100, and provides signals corresponding to the attachment and detachment of the stylus pen 168 to the controller 110.

Figure 4:
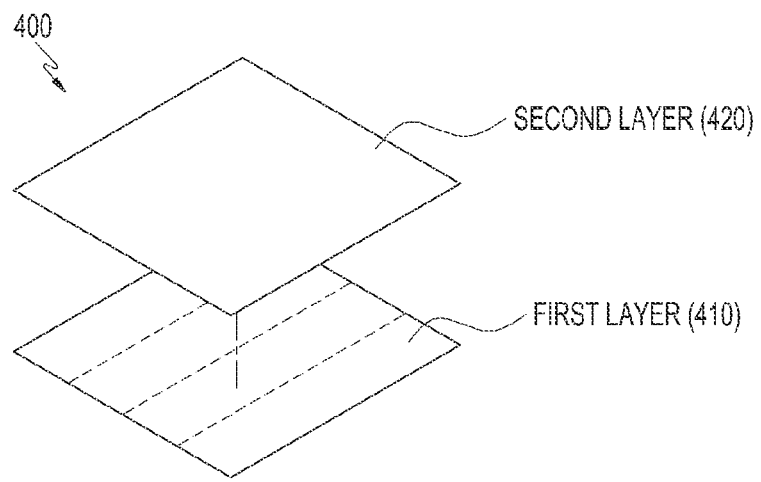
FIG. 4 illustrates a layer structure of a screen of a portable terminal according to an embodiment of the present disclosure.

FIG. 4 is a view illustrating a layer structure of a screen of the portable terminal according to an embodiment of the present.

Referring to FIG. 4, a screen 400 of the display unit of the portable terminal according to an embodiment of the present disclosure includes a first layer 410 and a second layer 420.

The first layer 410 is a layer which can display a background screen, an icon, and a shortcut icon. The background screen is a screen displayed to reflect data storage information in a visual condition included in a visual theme. The icon may have a form displayed in various shapes (including figures or pictures) and can indicate a current operation status, such as, a telephone indicating a call status, a speaker indicating a volume configuration item, and a battery indicating a battery status. The shortcut icons according to a number of pieces of application data stored in the mobile device may have various shapes (including figures or pictures).

The second layer 420 is layer which can display a shortcut icon window provided by a shortcut icon window providing method according to an embodiment of the present disclosure.

Further, the second layer 420 is located on a layer higher than the first layer 410. Accordingly, even while a current application is executed on the first layer, the shortcut icon window may be displayed on the second layer.

Figure 5:
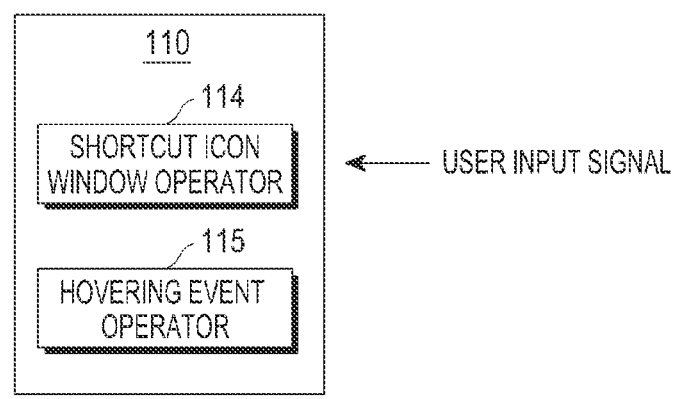
FIG. 5 is a block diagram illustrating a detailed configuration of a portable terminal to which a shortcut icon window displaying method according to an embodiment of the present disclosure is applied.

FIG. 5 is a block diagram illustrating a detailed configuration of the portable terminal to which the shortcut icon window displaying method according to an embodiment of the present disclosure is applied.

The controller 110 included in the portable terminal according to an embodiment of the present disclosure is configured to perform the shortcut icon window displaying method according to an embodiment of the present disclosure. To this end, the controller 110 includes a shortcut icon window operator 114 for collecting user input data to perform an operation for controlling the shortcut icon window, and a hovering event operator 115.

The shortcut icon window operator 114 receives user input signals, distinguishes the received user input signal into a click event and a drag event, and controls operations of the shortcut icon window corresponding to the events.

The click event is an event of touching a shortcut icon of the shortcut icon window by a user input and executes an application corresponding to the touched shortcut icon.

The drag event is classified into a general drag event and a flick event. In a method of controlling the shortcut icon window according to an embodiment of the present disclosure, a method of processing the general drag data and the flick event will be described in detail with reference to FIG. 9 below.

The hovering event operator 115 identifies whether the hovering event is generated on the touch screen by using position information (for example, X, Y, and Z coordinates) provided by the touch screen controller 195, detects an area where the hovering event is generated based on the X and Y coordinates, and detects a distance between the user's body or the touch input means (for example, stylus pen 168) and the touch screen 190 based on the Z coordinate. Further, the hovering event operator 530 may count a time for which the hovering event continues in the area where the hovering event is generated. In the method of controlling the shortcut icon window according to an embodiment of the present disclosure, a method of processing data generated in the hovering event operator 530 will be described in detail with reference to FIGS. 10A and 10B below.

The controller 110 may also be configured to implement various embodiments of a shortcut icon window controlling method described below and it goes without saying that the controller 110 can variously apply the various embodiments of the shortcut icon window controlling method described below as well as the configuration and operation of the above described embodiment. An operation of the shortcut icon window display method may be performed by the controller 110 in the following embodiments.

Figure 6:
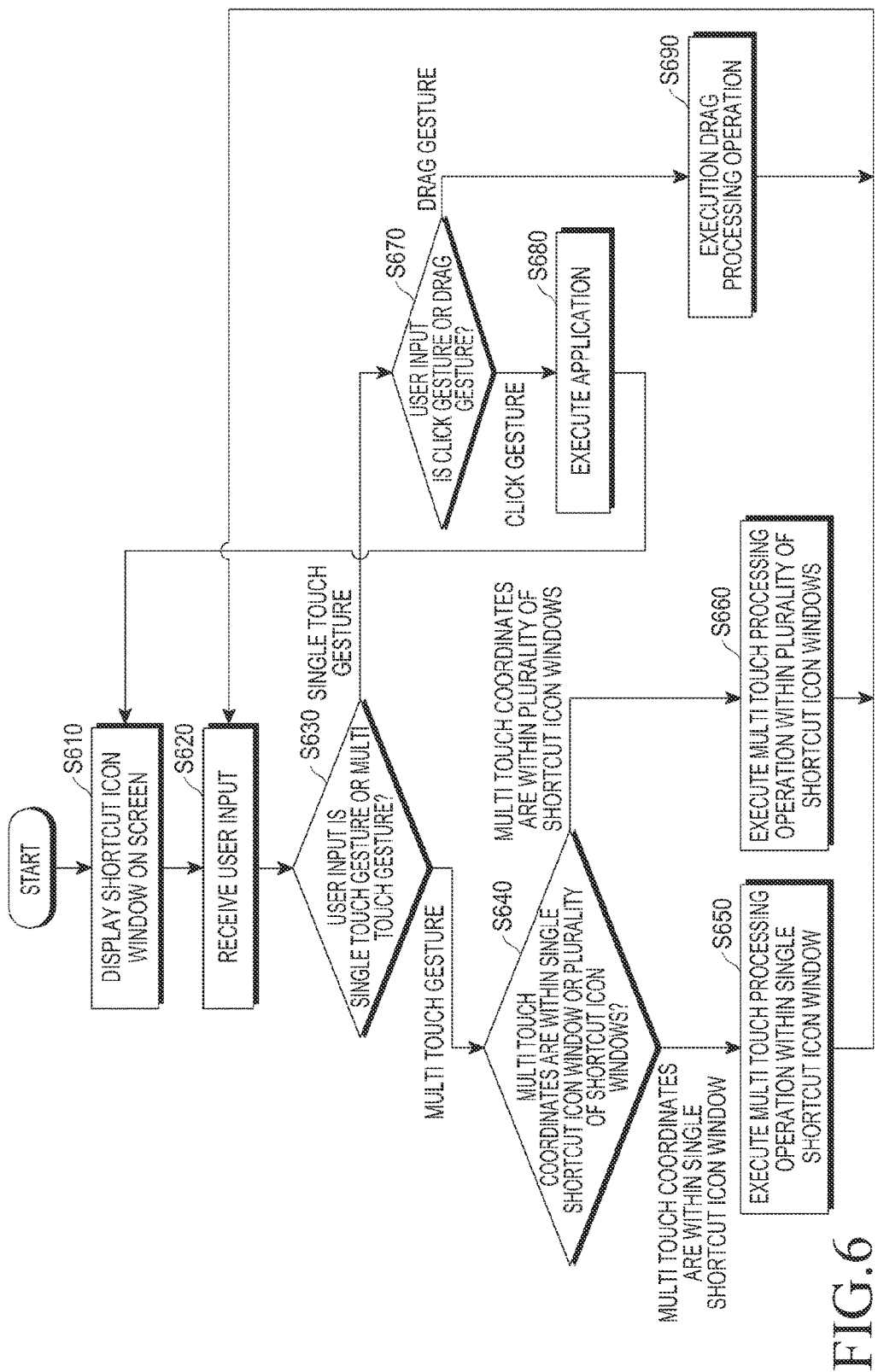
FIG. 6 is a flowchart illustrating an operation of a shortcut icon window displaying method according to an embodiment of the present disclosure.

FIG. 6 is a flowchart illustrating an operation of a shortcut icon window displaying method according to an embodiment of the present disclosure.

In the shortcut icon window displaying method, the shortcut icon window is displayed on the display unit (touch screen) in step S610 and the operation may be initiated by receiving a user input. For example, when a user input is received from the touch screen controller 195, the operation is initiated. That is, when the controller 110 receives data (for example, a digital signal for X, Y, and Z coordinates of user input data) generated in response to proximity of the user input unit from the touch screen controller 195, the operation is initiated in step S620. Here, the shortcut icon window includes one or more shortcut icons and is displayed on the second layer of the touch screen 190 included in the mobile device.

In step S630, it is determined whether the user input received in step S620 is a single touch gesture or a multi touch gesture. Since the single touch gesture and the multi touch gesture have been described above, a detailed description thereof will be omitted.

If it is determined in step S630 that the user input is a multi touch gesture, in step S640, the portable terminal receives the data of the multi touch gesture and determines whether multi touch coordinates are located within a shape of a single shortcut icon or within shapes of a plurality of shortcut icon windows located at different positions. For example, the portable terminal determines the position of the shortcut icon window based on coordinates of edges of the shortcut icon window and determines whether the positions of the multi touch coordinates are within the shape of the short icon window.

When all the multi touch coordinates are within the single shortcut icon window in step S640, corresponding data processing is performed in step S650, according to the operation of the multi touch within the single icon window according to an embodiment of the present disclosure described in detail with reference to FIG. 7 below. The portable terminal then returns to step S620 to wait to receive a next user input.

When the multi touch coordinates are within shapes of a plurality of shortcut icon windows located at different positions in step S640, corresponding data processing is performed in step S660 according to the operation of the multi touch within the plurality of shortcut icon windows according to an embodiment of the present disclosure described in detail with reference to FIG. 8 below. The portable terminal then returns to step S620 to wait to receive a next user input.

Meanwhile, if it is determined in step S630 that the user input is a single touch gesture, in step S670, the portable terminal receives the data of the single touch gesture and determines whether the user input is a click gesture or a drag gesture based on the data of the received single touch gesture. For example, the click gesture and the drag gesture may be determined based on a movement change (trace) of the coordinate of the received touch data.

When the user input is the click gesture as a result of the determination of step S670, one of a plurality of shortcut icons existing within the shortcut icon window according to an embodiment of the present disclosure is clicked in step S680, and an application corresponding to the shortcut icon located at the clicked coordinate is executed. Thereafter, the portable terminal proceeds to step S620 to wait to receive a next user input. That is, since the shortcut icon window is displayed on the second layer of the touch screen while the application is executed, the portable terminal moves to step S620 to wait to receive the next user input.

When the user input is the drag gesture as a result of the determination of step S670, the drag gesture is input within the shortcut icon window in step S690, and the portable terminal performs corresponding data processing according to the drag of the shortcut icon window according to an embodiment of the present disclosure described in detail with reference to FIG. 9 below. The portable terminal then moves to step S620 to wait to receive a next user input.

Figure 7:
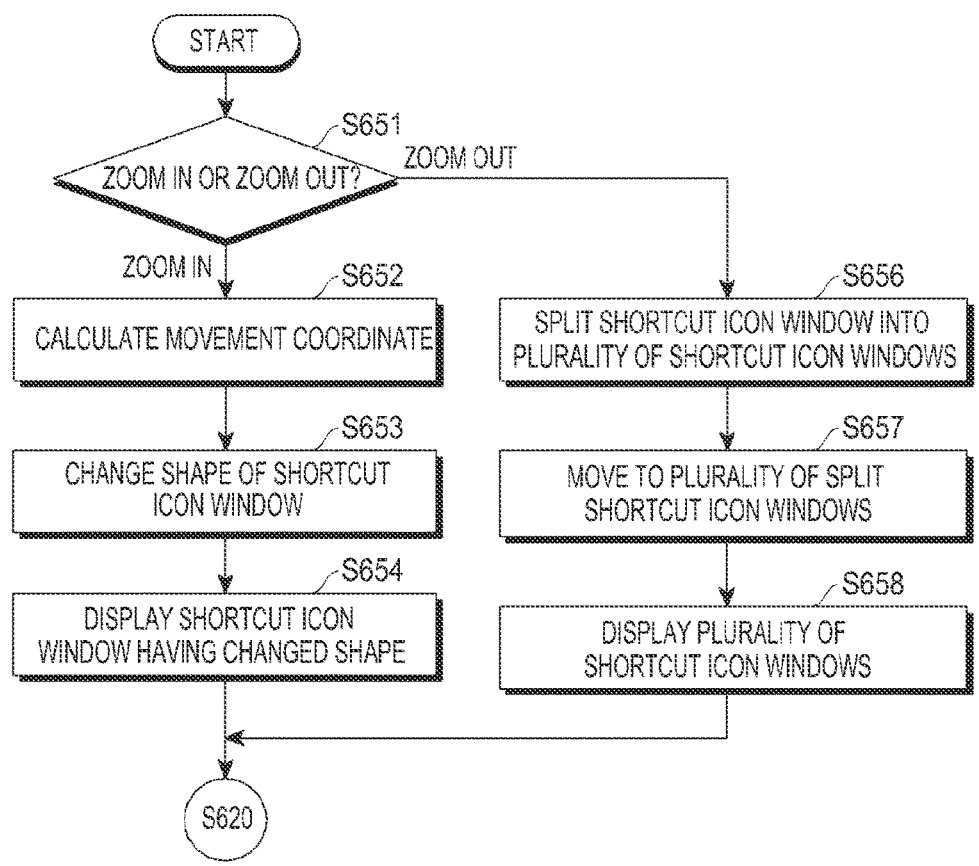
FIG. 7 is a flowchart illustrating an operation of a multi touch within a boundary of a single shortcut icon window according to an embodiment of the present disclosure.

FIG. 7 is a flowchart illustrating an operation of a multi touch within a boundary of a single shortcut icon window according to an embodiment of the present disclosure.

When the multi touch coordinates are located within the single shortcut icon window in step S640 of FIG. 6, the operation is initiated.

In step S651, the controller 110 determines whether the multi touch coordinates located within the single shortcut icon window move to be closer (zoom-in) to each other or move to be apart (zoom-out) from each other. For example, the controller 110 may determine a movement direction of the multi touch based on a coordinate change (trace) from current touch coordinates to previous touch coordinates of the multi touch coordinates.

When the movement direction of the multi touch of the user is a direction in which the multi touch coordinates move closer to each other within the boundary of the single shortcut icon window, that is, when the multi touch corresponds to a zoom-in gesture in step S651, a center coordinate of the coordinates where the multi touch coordinates ends may be obtained as a movement coordinate in step S652.

In step S653, a shape of the shortcut icon window in step S652 is changed. For example, the shortcut icon window may be changed by reducing a size of the shape of the shortcut icon window. The changed shortcut icon window may use a drawing of a representative shortcut icon of the plurality of shortcut icons included in the single shortcut icon window and may have various shapes, such as a text, a figure according to a user's setting, and a character which can express a common characteristic of the plurality of shortcut icons included in the shortcut icon window.

The portable terminal moves the shortcut icon window changed in step S653 to the coordinate obtained in step S652 and displays the changed shortcut icon window on the second layer of the touch screen in step S654, and then returns to step S620 to wait to receive a next user input.

Meanwhile, when the movement direction of the multi touch of the user in step S651 is an outward direction in which the multi touch coordinates go beyond the boundary of the single shortcut icon window, that is, when the multi touch corresponds to a zoom-out gesture, the portable terminal may split the corresponding shortcut icon window into a plurality of shortcut icon windows in step S656. Since a split direction and a split reference have been described in detail in the description of the term "multi touch", a description thereof will be omitted.

In step S657, the portable terminal moves the plurality of shortcut icon windows split in step S656 to final coordinates to where the multi touch ends, in step S657. For example, the plurality of split shortcut icon windows move in movement directions of the multi touch coordinates and then stop the movement when reaching the final coordinates where the multi touch ends.

The portable terminal displays the shortcut icons which have stopped the movement in step S657 on the second layer of the touch screen in step S658 and then returns to step S620 to wait to receive a next user input.

Figure 8:
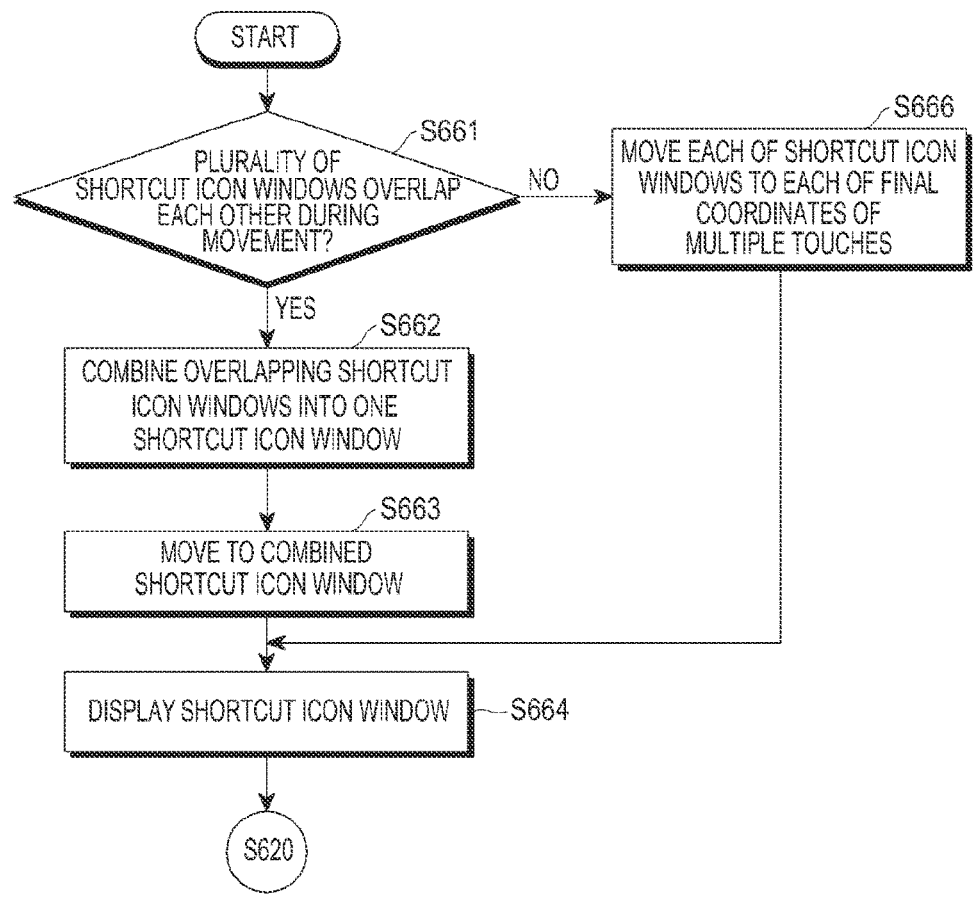
FIG. 8 is a flowchart illustrating an operation of a multi touch within boundaries of a plurality of shortcut icon windows according to an embodiment of the present disclosure.

FIG. 8 is a flowchart illustrating an operation of a multi touch within boundaries of a plurality of shortcut icon windows according to an embodiment of the present disclosure.

When the multi touch coordinates are located with boundaries of the plurality of shortcut icon windows (displayed on different positions) in step S640 of FIG. 6, the operation is initiated.

In step S661, the portable terminal determines whether any of the plurality of shortcut icon windows overlap each other while moving according to a coordinate change (trace) of the multi touch after the multi touch is made on the plurality of shortcut icon windows located at different positions.

When some of the plurality of shortcut icon windows which are moving after the multi touch is generated overlap each other (areas of the shortcut icon windows overlap) in step S661, the portable terminal combines the plurality of overlapping shortcut icon windows into one shortcut icon window in step S662.

In step S663, the portable terminal arranges the shortcut icon window combined in step S662 based on overlapping initial coordinates.

Further, the portable terminal receives a user input additionally made after the plurality of shortcut icon windows are combined into one shortcut icon window in step S662, so as to be in a movable status (focus status or active status) and then may move the shortcut icon window to a coordinate of an area touched according to another additional user input.

In step S664, the portable terminal displays the shortcut icon window which has stopped the movement in step S663 on the second layer of the touch screen and then returns to step S620 to wait receive a next user input.

Meanwhile, when the shortcut icon windows do not overlap each other while moving in step S661, the portable terminal moves the plurality of shortcut icon windows to respective positions where the multi touch ends in step S666.

The portable terminal displays the plurality of shortcut icon windows which have stopped the movement in step S666 on the second layer of the touch screen in step S664 and then returns to step S620 of FIG. 6 to wait to receive a next user input.

Figure 9:
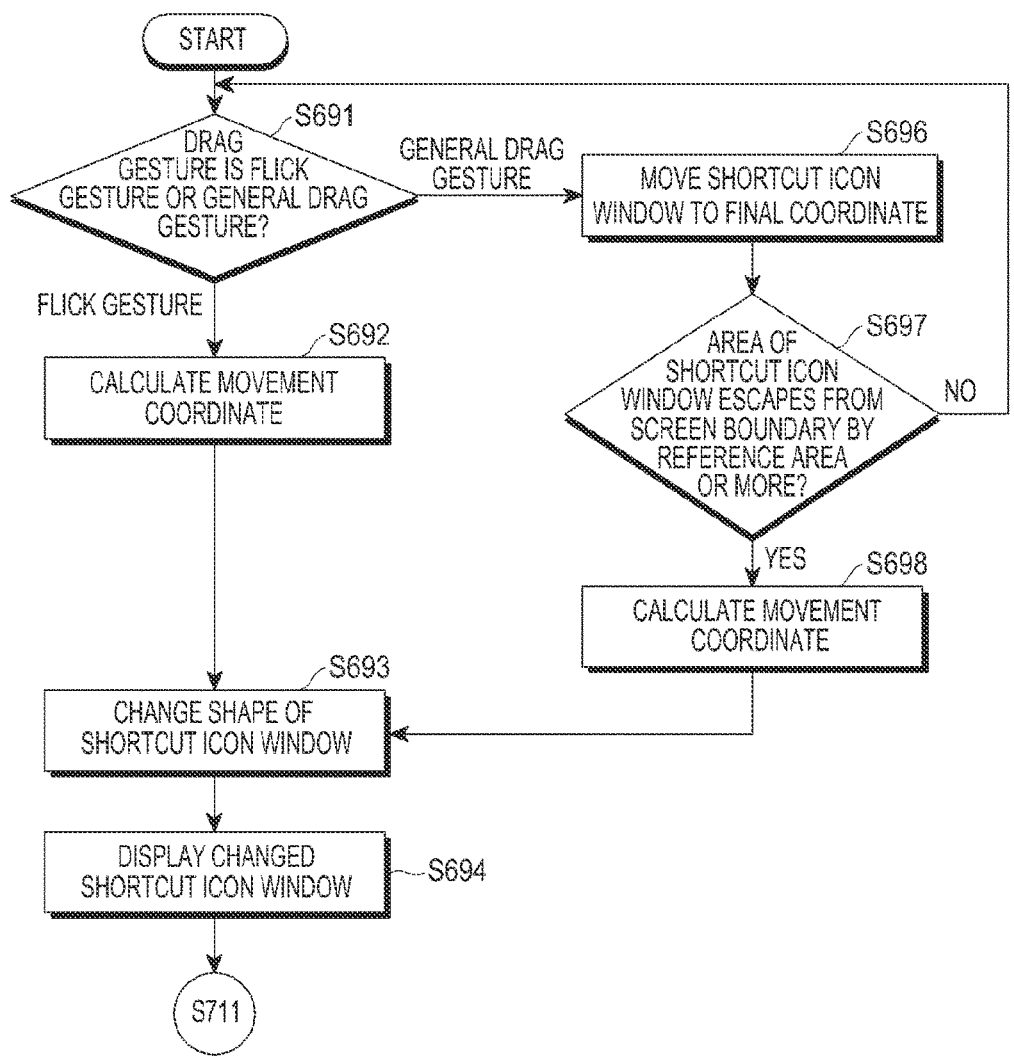
FIG. 9 is a flowchart illustrating a drag action of a shortcut icon window according to an embodiment of the present disclosure.

FIG. 9 is a flowchart illustrating a drag action of a shortcut icon window according to an embodiment of the present disclosure.

When the single touch gesture is the drag gesture in step S670 of FIG. 6, the operation is initiated.

In step S691, it may be determined whether the drag gesture received in step S670 is a general drag gesture or a flick gesture. For example, the general drag gesture and the flick gesture may be determined based on a determination of whether a distance (for example, number of selected pixels) between a current touch coordinate value (X2 and Y2) and a previous touch coordinate value (X1 and Y1) of continuous coordinate data of the drag gesture is greater than or equal to a preset reference.

The flick gesture may be determined based on data, such as a movement distance between the current touch coordinate value (X2 and Y2) and the previous touch coordinate value (X1 and Y1), a time T spent for the movement, and an angle θ between a horizontal line H which passes through the X value of the previous touch coordinate and a drag movement direction.

When the drag gesture is determined to be the flick gesture in step S691, the portable terminal calculates a coordinate to which the corresponding shortcut icon window will move in step S692. The movement coordinate may be obtained by expanding a virtual extension line passing through the previous touch coordinate value (X1 and Y1) and the current touch coordinate value (X2 and Y2) to a boundary of the touch screen and calculating a coordinate a point of contact between the extension line and the boundary of the touch screen.

In step S693, the portable terminal changes the shape of the shortcut icon window before moving the shortcut icon window to the movement coordinate in step S692. Since a description of the changed shape of the shortcut icon window is the same as the description the changed shortcut icon window discussed above in the description of terms, a detailed description thereof will be omitted.

In step S694, the portable terminal moves the shortcut icon window having the shape changed in step S693 to the movement coordinate calculated in step S692, and displays the changed shortcut icon window which has completed the movement on the second layer of the touch screen. The portable terminal then proceeds to step S710 of FIG. 10 to wait for receiving a next user input.

Meanwhile, when the drag gesture is determined to be the general drag gesture in step S691, the portable terminal moves the corresponding shortcut icon window to a final coordinate where the drag gesture ends in step S696.

In step S697, the portable terminal determines whether an area of the shortcut icon window escapes from the boundary of the touch screen by an area greater than or equal to a reference area while moving the shortcut icon window in step S696. When the shortcut icon window does not escape from the boundary of the touch screen by the area greater than or equal to the reference area, the portable terminal completes the movement of the corresponding shortcut icon window and then returns to step S691 to wait to determine whether a next drag gesture is the general drag gesture or the flick gesture.

The reference area may be configured as ¾ of an entire area of the shortcut icon window which is moving.

When the shortcut icon window escapes from the boundary of the touch screen by the area greater than or equal to the reference area in step S697, the portable display calculates a movement coordinate of the corresponding shortcut icon window in step S698. A center coordinate of the boundary of the touch screen which the corresponding shortcut icon window initially meets may be obtained as the movement coordinate. Thereafter, steps S693 and S694 are performed in the same manner as the above described process. The area of the shortcut icon window may be calculated based on coordinates of edges of the shortcut icon window and the calculation of the shortcut icon window which escapes from the boundary of the touch screen may be performed based on a current coordinate of one of the coordinates of the edges and an entire area of the shortcut icon window. For example, it may be determined how much the area of the shortcut icon window escapes from the boundary of the touch screen based on a coordinate of a left uppermost edge.

Figure 10A:
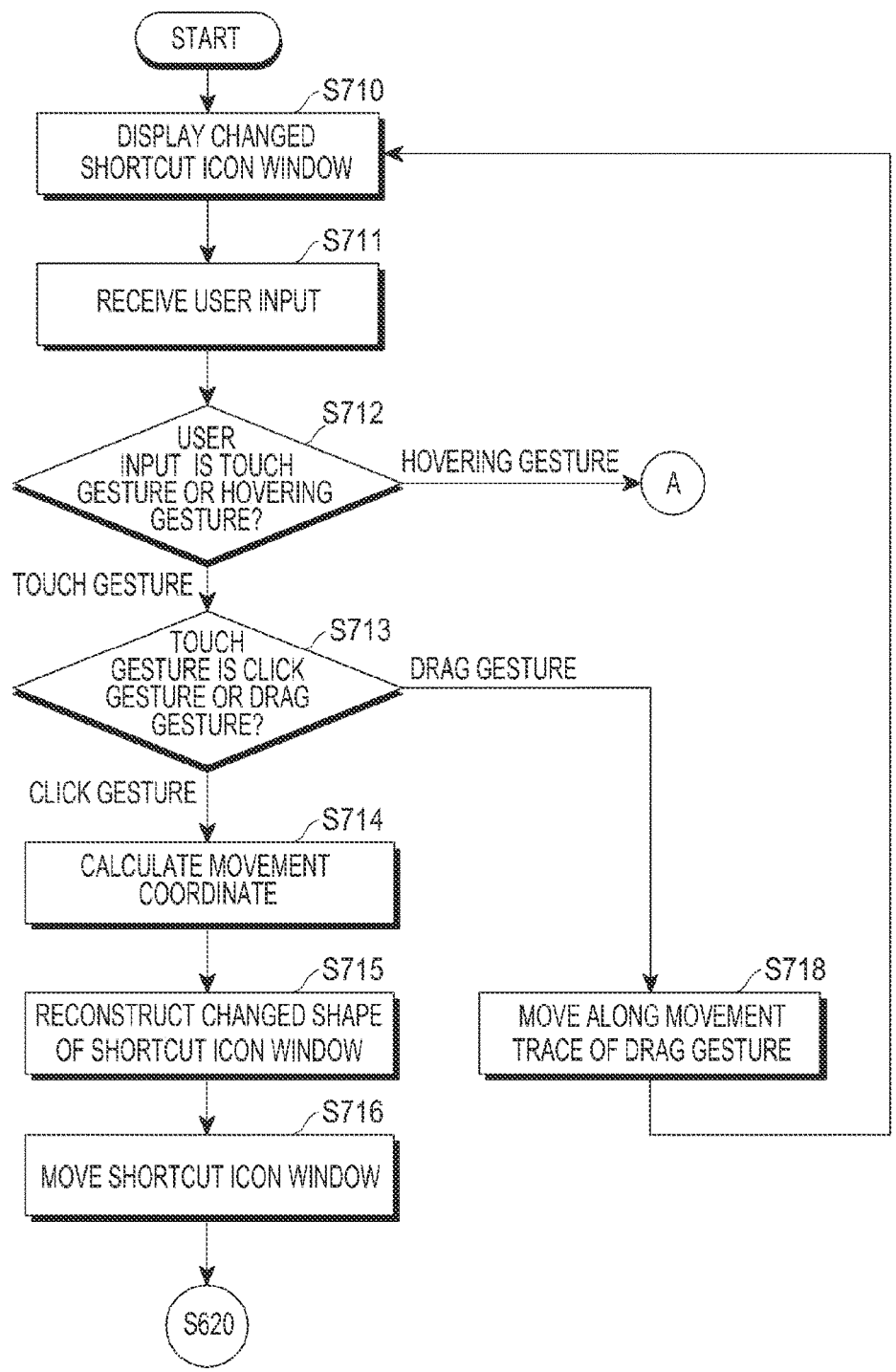
FIGS. 10A and 10B are flowcharts illustrating an operation of a method of displaying a changed shortcut icon window according to an embodiment of the present disclosure.
Figure 10B:
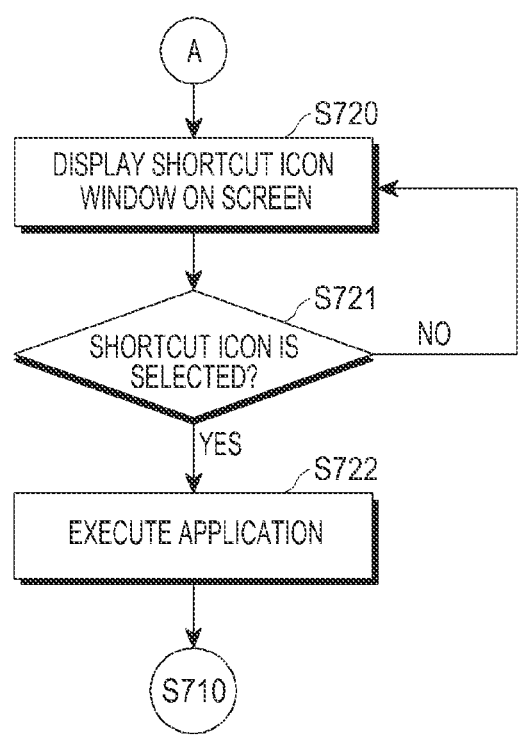

FIGS. 10A and 10B are flowcharts illustrating an operation of a method of displaying the changed shortcut icon window according to an embodiment of the present disclosure.

In FIG. 10A, in a method of controlling the changed shortcut icon window, the changed shortcut icon window is displayed on the touch screen in step S710 and the operation is initiated by receiving a user input. For example, when a user input is received from the touch screen controller 195, the operation is initiated. That is, when the controller 110 receives data (for example, a digital signal for X, Y, and Z coordinates of user input data) generated in response to proximity of the user input unit from the touch screen controller 195, the operation is initiated in step S711. Here, the changed shortcut icon window is a window having a shape changed from the shortcut icon window including one or more shortcut icons and displayed on the second layer of the touch screen 160 included in the mobile device.

In step S712, the user input received in step S711 is determined to be a touch gesture or a hovering gesture. For example, the touch gesture and the hovering gesture may be determined based on the fact that the touch gesture is a digital signal for X and Y coordinates and the hovering gesture is a digital signal for X, Y, and Z coordinates.

When the touch gesture is received in step S712, it is determined whether the touch gesture is a click gesture or a drag gesture in step S713. For example, the click gesture and the drag gesture may be determined based on a movement change (trace) of coordinates of received touch data.

When the touch gesture is determined to be the click gesture in step S713, the portable terminal obtains a coordinate of a position before the shortcut icon window is changed as a movement coordinate in step S714.

In step S715, the shortcut icon window changed in step S714 may be reconstructed to the shape before the change.

In step S716, the portable terminal moves the shortcut icon window reconstructed in step S715 to the movement coordinate obtained in step S714. Then, the portable terminal displays the shortcut icon window on the second layer of the touch screen and returns to step S620 to wait to receive a next user input.

Meanwhile, when the touch gesture is determined to be the drag gesture in step S713, the portable terminal maintains the changed shortcut icon window and completes the movement of the corresponding changed shortcut icon window according to a movement direction of the drag in step S718, and then returns to step S710 to display the changed shortcut icon window on the second layer of the touch screen.

Further, the changed shortcut icon window may be additionally changed according to an area of the touch screen where the drag is generated during the drag movement. For example, when the drag is made while contacting the boundary of the touch screen, the shortcut icon window may be changed to a bar shape including a text which can express a common feature of a plurality of icons included in the changed shortcut icon window.

Further, when the drag moves to a home screen, the changed shortcut icon window may be displayed on the same position as a position where shortcut icons 191-1, 191-2, and 191-3 of FIG. 2 are located. At this time, since the changed shortcut icon window is displayed on the second layer of the touch screen, the changed shortcut icon window may be displayed without a position change even though the home screen is switched to another screen.

Meanwhile, referring to FIG. 10B, in step S720, data of the hovering gesture of step S712 may be received. For example, when the stylus pen 168 supporting the hovering approaches the area of the changed shortcut icon window within a range of a reference distance, a hovering event may be generated. When the hovering event is generated, the controller may display the shortcut icon window before the change in a popup form while maintaining to display the changed shortcut icon window on the touch screen in step S720.

In step S721, it is determined whether one of shortcut icons included in the shortcut icon window displayed on the second layer of the touch screen in step S720 is selected by a user input. When the user input is not selected, the portable terminal returns to step S720 to wait to receive a next hovering event.

When one of the shortcut icons included in the shortcut icon window is selected by the user input in step S721, an application corresponding to the shortcut icon is executed in step S722. At this time, the portable terminal may terminate displaying the shortcut icon window and return to step S710 to display the changed shortcut icon window on the second layer of the touch screen.

Figure 11:
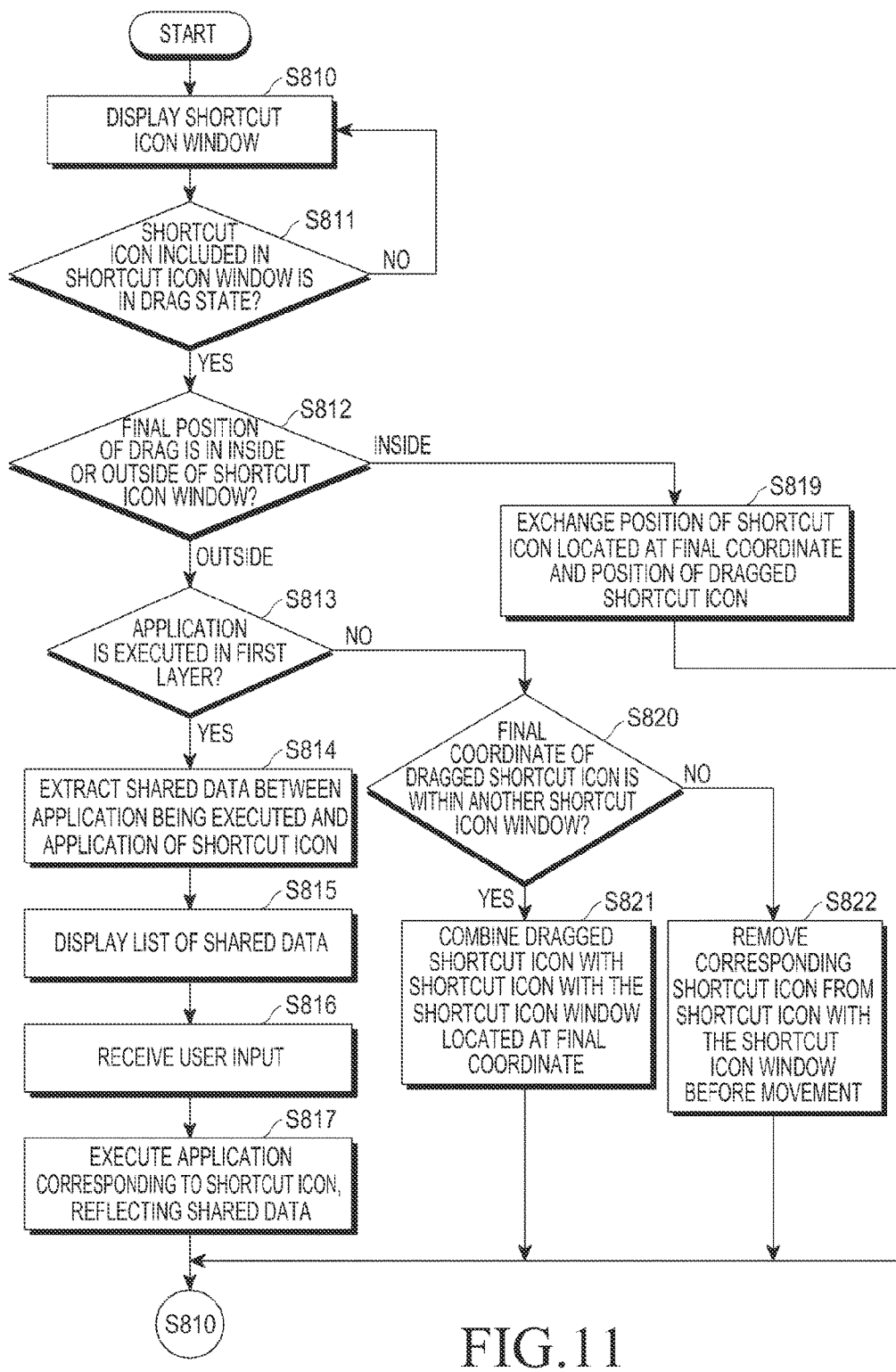
FIG. 11 is a flowchart illustrating an operation of editing shortcut icons of a shortcut icon window and an operation of sharing data according to an embodiment of the present disclosure.

FIG. 11 is a flowchart illustrating an operation of editing shortcut icons of the shortcut icon window and an operation of sharing data according to an embodiment of the present disclosure.

In a method of editing shortcut icons of the shortcut icon window and sharing data, the shortcut icon window is displayed on the touch screen in step S810 and the operation may be initiated by receiving a user input. In step S811, it is determined whether the user input received in step S810 is a drag gesture of selecting an area within the boundary of the shortcut icon window. When the user input is not a drag gesture, the portable terminal returns to step S810 to wait to receive a drag gesture of selecting an area within the shortcut icon window.

When the user input is a drag gesture in step S811, it is determined whether a final position where the drag ends is inside or outside the boundary of the shortcut icon window in step S812. When the final position where the drag ends is inside the boundary of the shortcut icon window, the portable terminal moves to step S819. When the final position where the drag ends is outside the boundary of the shortcut icon window, the portable terminal moves to step S813.

When the final position where the drag ends is outside the boundary of the shortcut icon window in step S812, it is determined whether an application is currently executed on the first layer in step S813. When the application is currently executed, the portable terminal moves to step S814. When the application is not currently executed, the portable terminal moves to step S820.

One of the shortcut icons included in the shortcut icon window is moved to the outside of the boundary of the shortcut icon window by the drag gesture. That is, in step S814, the one shortcut icon is dragged and dropped to a screen of the application being currently executed on the first layer in step S813. At this time, the controller extracts data to be shared with an application corresponding to the dragged and dropped shortcut icon from shared data of the application being currently executed. When the application is executed, the controller may pre-store shared data to be shared with other applications in a storage space in a prearranged form. For example, when the application being executed is a phone number related application, the shared data to be shared with other applications may be a phone number, an email address, a website address, and birthday information data.

Further, when the application is an album related application, the data to be shared with other applications may be information on a path of a picture file.

In addition, when the application is a memo related application, the data to be shared may be content of the memo.

When data to be shared are more than one in step S814, a list of the data to be shared is displayed on the touch screen in a popup form in step S815.

In step S816, data to be actually shared among the data to be shared displayed in step S815 is obtained through a user input. When the data to be shared is one, the data to be shared is obtained without the user input.

Then, in step S817, the portable terminal executes the application corresponding to the dragged and dropped shortcut icon, reflecting the data to be shared in step S816, and then returns to step S810 to display the shortcut icon window on the second layer of the touch screen.

Meanwhile, when the application is not currently executed in the first layer in step S813 and the shortcut icon dragged from the shortcut icon window is being dragged to the outside of the boundary of the shortcut icon window, in step S820, it is determined whether a coordinate of a final position where the drag ends is located inside or outside of another shortcut icon window.

When the final position where the drag ends is inside the boundary of another shortcut icon window in step S820, the portable terminal combines the shortcut icon with the shortcut icon window where the drag ends in step S821, and then returns to step S810 to display the shortcut icon window on the second layer of the touch screen.

Meanwhile, when the final position where the drag ends is outside the boundary of another shortcut icon window in step S820, the portable terminal removes the shortcut icon from the shortcut icon window in which the shortcut had been included before the drag in step S822, and returns to step S810 to display the shortcut icon window on the second layer of the touch screen.

Meanwhile, when the final position where the drag ends is inside the boundary of another shortcut icon window in step S812, the portable terminal exchanges the shortcut icon at the position where the drag ends and the dragged shortcut icon in step S819, and then returns to step S810 to display the shortcut icon window on the second layer of the touch screen.

Figure 12A:
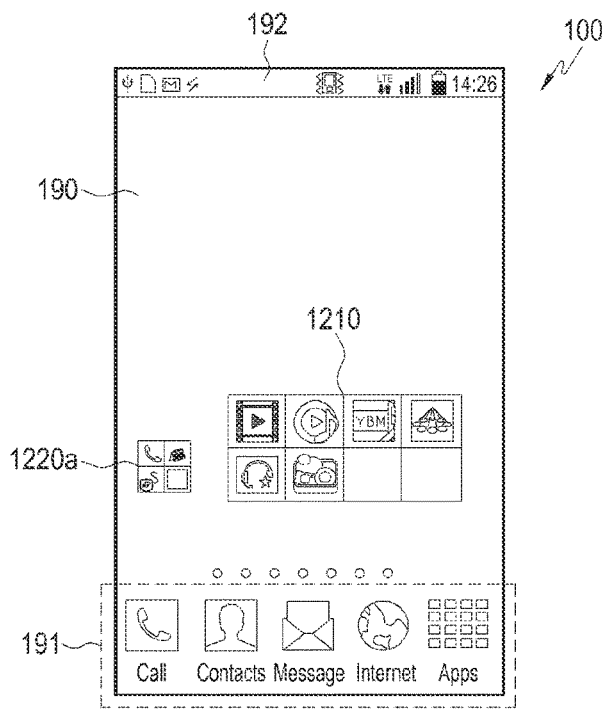
FIGS. 12A and 12B illustrate examples of a screen in which a shortcut icon window is executed according to the present disclosure.
Figure 12B:
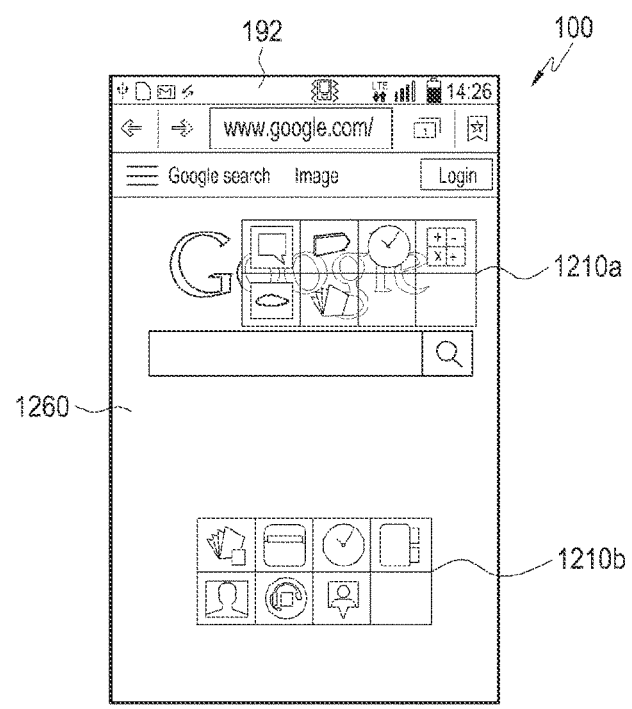

FIGS. 12A and 12B illustrate various examples of a screen in which the shortcut icon window according to the present disclosure is executed.

FIG. 12A illustrates an example of displaying the shortcut icon window and the changed shortcut icon window together on the touch screen of the mobile device according to an embodiment of the present disclosure, and FIG. 12B illustrates an example of displaying a plurality of shortcut icons on the second layer while an application is executed on the first layer of the mobile device according to an embodiment of the present disclosure.

In FIG. 12A, the mobile device 100 displays a shortcut icon window 1210, 1210a on the second layer even while an application is being currently executed on the first layer of the touch screen as indicated by a reference numeral 1260. Accordingly, although the application is being currently executed, a corresponding application may be executed by selecting a shortcut icon included in the shortcut icon window 1210.

Further, the mobile device 100 may receive a user input, change a shape of the shortcut icon window 1210 to a shape corresponding to the user input, and display the changed shortcut icon window on the second layer. For example, the mobile device 100 may display a changed shortcut icon window 1220 having a shape reduced from the original shape by a zoom in gesture on the second layer.

Further, the mobile device 100 may simultaneously display a plurality of shortcut icon windows 1210 and a plurality of shortcut icon windows 1220 on the second layer.

Figure 13:
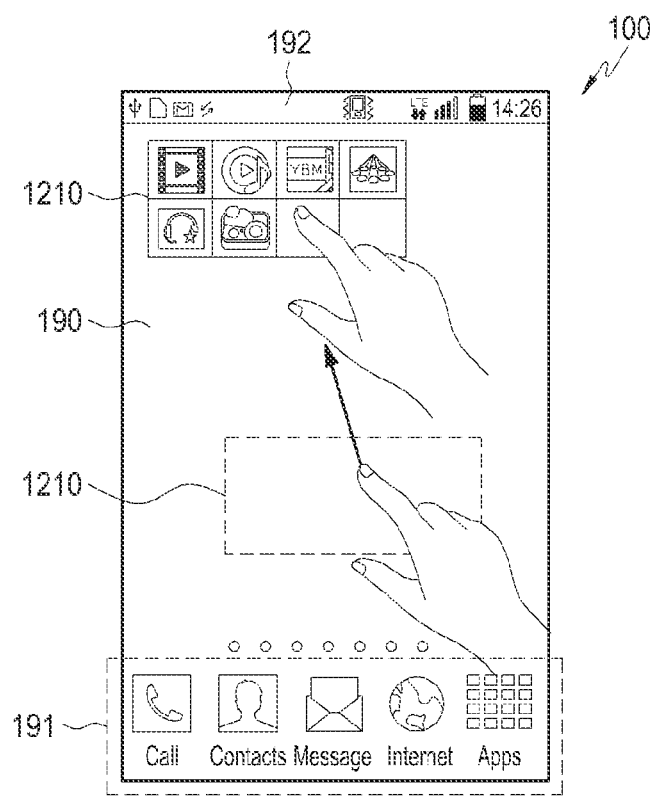
FIG. 13 illustrates an example of moving a shortcut icon window within a touch screen of a portable terminal by a drag according to the present disclosure.
Figure 14A:
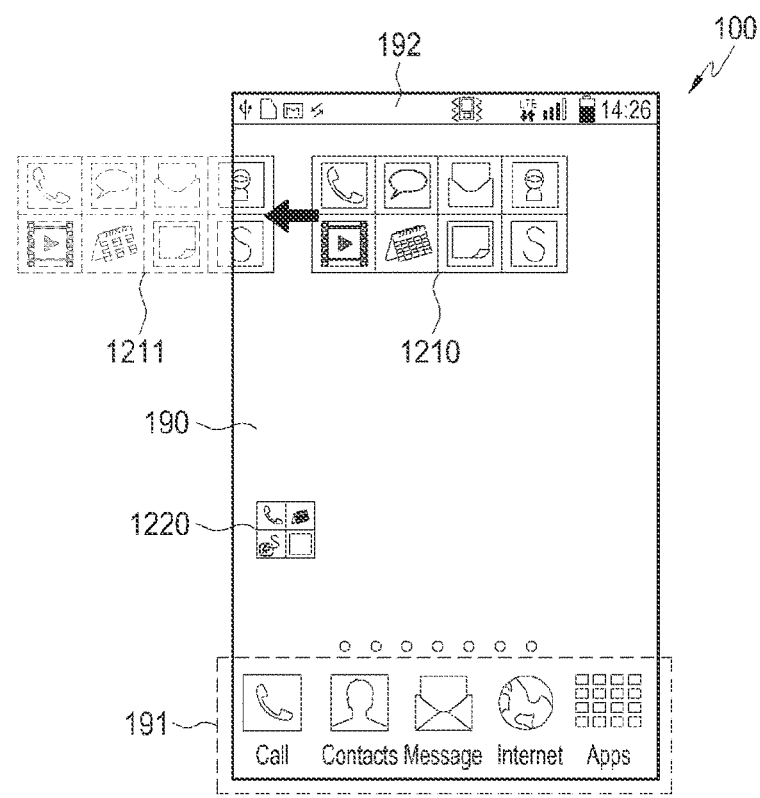
FIGS. 14A, 14B, and 14C illustrate an example of flicking a shortcut window icon in a boundary direction of a touch screen and displaying a changed shortcut icon window in a screen boundary according to the present disclosure.
Figure 14B:
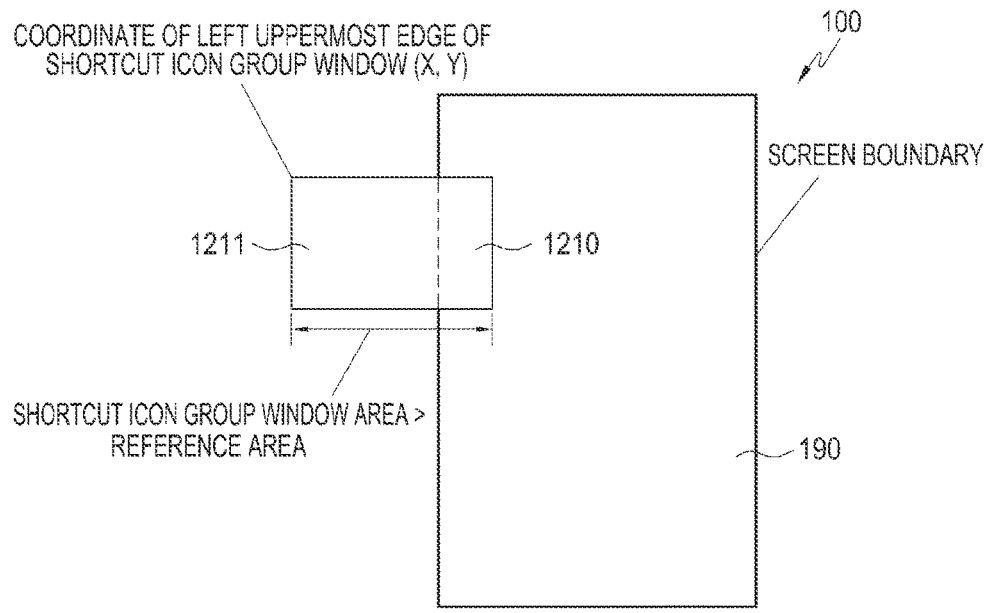
Figure 14C:
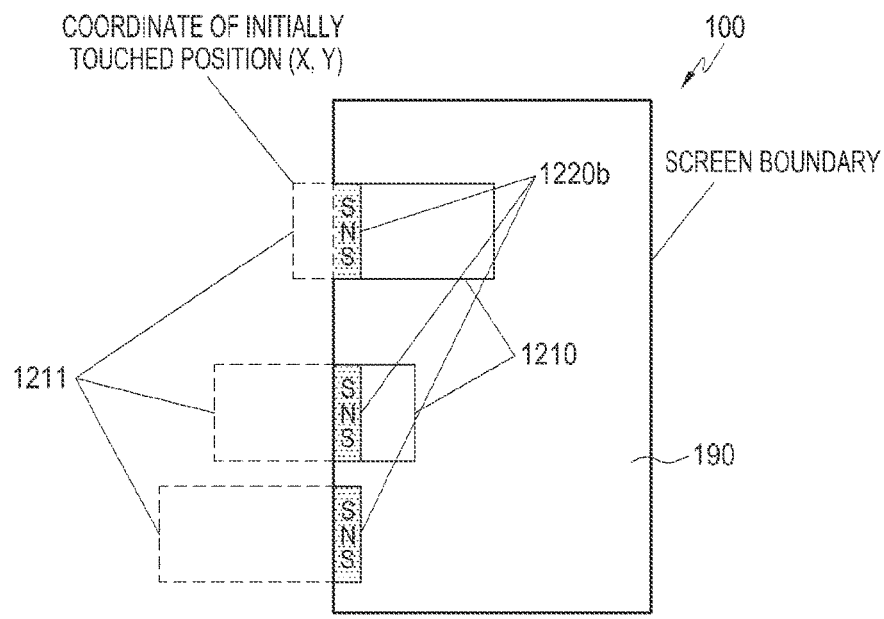

FIG. 13 illustrates an example in which the mobile device receives a drag gesture and moves the shortcut icon window according to an embodiment of the present disclosure, FIG. 14A illustrates an example in which, when a direction of the received drag is a direction to the boundary of the touch screen, the mobile device moves the shortcut icon window according to an embodiment of the present disclosure, FIG. 14B illustrates an example in which the mobile device determines whether a shape of the shortcut icon window is changed by comparing an area escaping from the boundary and a reference area in order to change a shape of the shortcut icon window escaping from the boundary of the touch screen, and FIG. 14C illustrates an example of displaying a process of changing the shape of the shortcut icon window which receives a drag gesture in the boundary of the touch screen of the mobile device and moves a position thereof.

When the shortcut icon window 1210 displayed on the second layer of the touch screen 190 receives the drag gesture, the mobile device moves the shortcut icon window 1210 to a final coordinate where the drag ends.

Meanwhile, the shortcut icon window 1210 may escape from the boundary of the touch screen 190 while moving. In this case, the mobile device 100 determines whether to change a shape of the shortcut icon window 1210 by comparing an area escaping from the boundary of the touch screen of an entire area of the shortcut icon window 1210 and a preset reference area (for example, ¾ of the entire area of the shortcut icon window).

When the area 1211 escaping from the boundary is greater than or equal to the reference area, the mobile device 100 changes the shape of the shortcut icon window 1210 and moves the changed shortcut icon window 1220*b* based on a center of points of contact with the boundary of the touch screen 190, so as to display the changed shortcut icon window on the second layer of the touch screen 190.

Figure 15A:
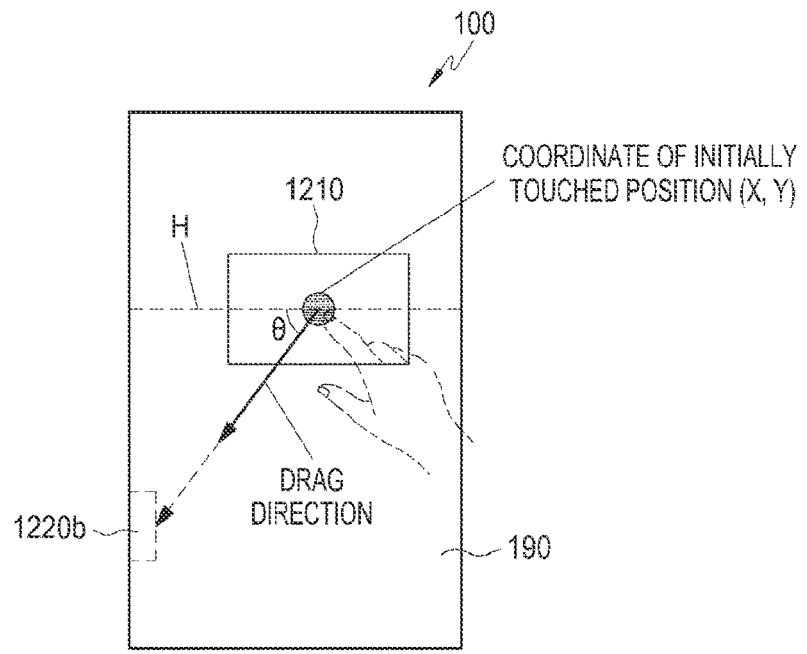
FIGS. 15A and 15B illustrate an example of changing a shape of a shortcut icon window and displaying the changed shortcut icon window when a direction of a flick gesture received by the portable terminal according to the present disclosure is a boundary direction of a touch screen.
Figure 15B:
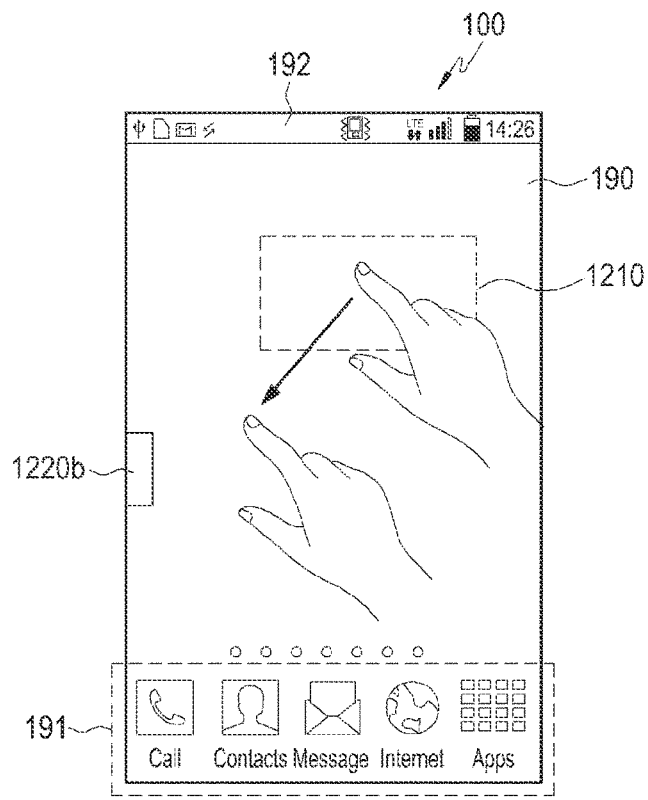

FIGS. 15A and 15B illustrate an example of changing a shape of the shortcut icon window and displaying the changed shortcut icon window when a direction of a flick gesture received by the mobile device according to the present disclosure is a boundary direction of the touch screen.

When a position of the flick gesture received by the mobile device 100 is within the shortcut icon window 1210 displayed on the touch screen 190, the mobile device 100 changes the shape of the shortcut icon window 1210 and moves the changed shortcut icon window 1220*b* by configuring a point of contact between the direction of the flick gesture and the boundary of the touch screen 190 as a center coordinate.

Figure 16A:
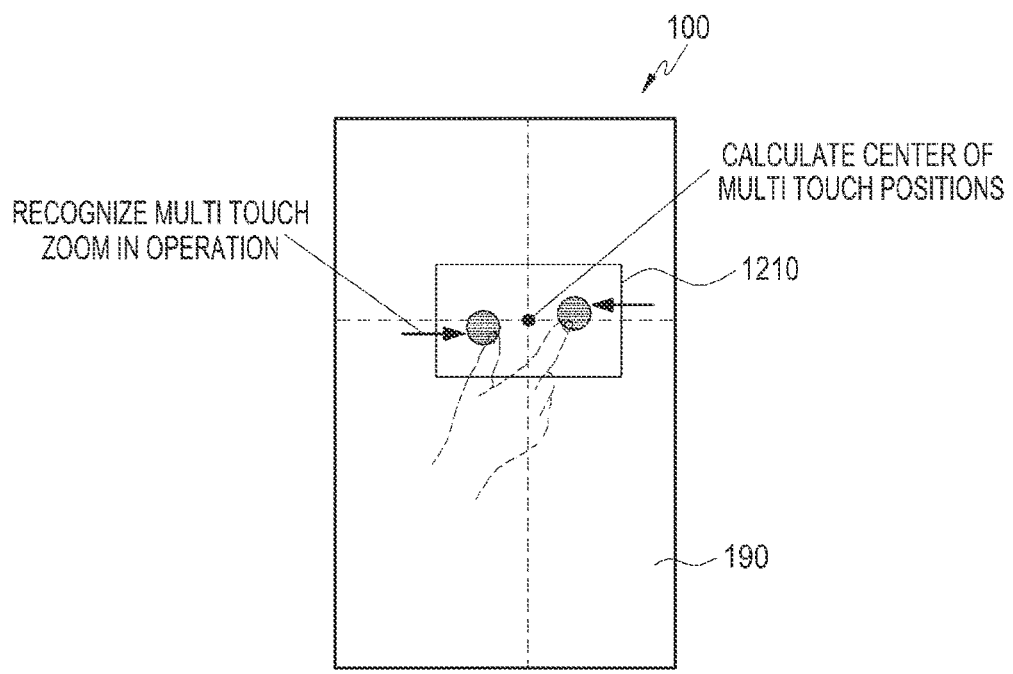
FIGS. 16A and 16B illustrate methods of changing a shape of a shortcut icon window according to the present disclosure.
Figure 16B:
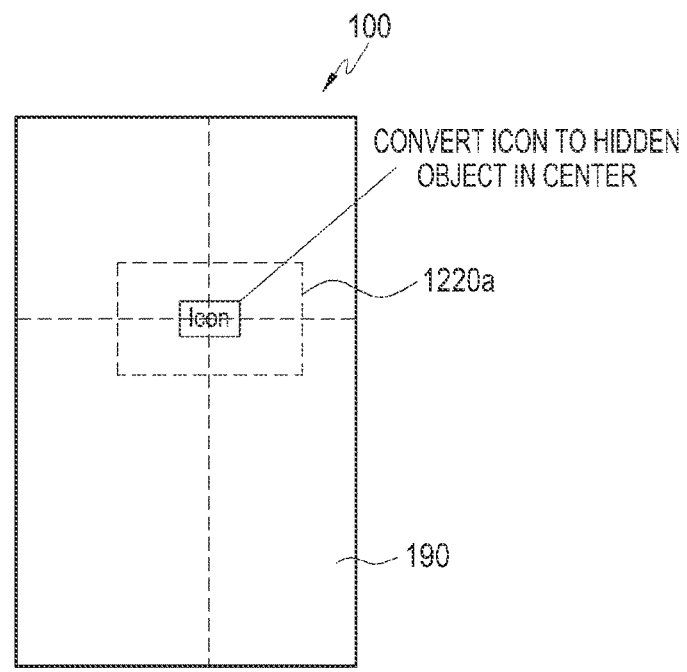

FIGS. 16A and 16B illustrate various methods of changing the shape of the shortcut icon window according to the present disclosure.

FIG. 16A illustrates an example of displaying a process in which the mobile device receives a multi touch gesture and changes a shape of the shortcut icon window according to an embodiment of the present disclosure, and FIG. 16B illustrates an example of displaying a process in which the mobile device determines a coordinate to which the changed shortcut icon window will be moved.

When the received multi touch gesture is located within the boundary of the shortcut icon window 1210 displayed on the touch screen 190 and multi touched positions move closer (zoom-in) to each other, the mobile device 100 changes the shape or size of the corresponding shortcut icon window 1210. The changed shortcut icon window 1220*a* may be moved to a center coordinate of the shortcut icon window 1210 before the shape is changed.

Figure 17:
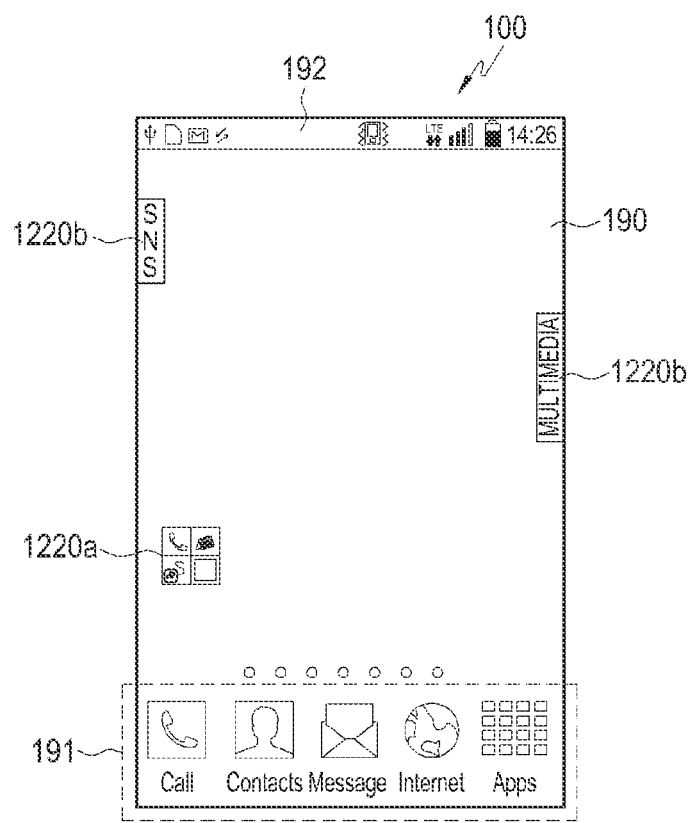
FIG. 17 illustrates an example in which a plurality of changed shortcut icon windows having different shapes are displayed on a second layer of a touch screen together according to the present disclosure.

FIG. 17 illustrates an example in which a plurality of changed shortcut icon windows having different shapes are displayed on the second layer of the touch screen together according to the present disclosure.

The mobile device 100 displays a plurality of changed shortcut icon windows 1220 on the second layer of the touch screen 190. The plurality of the changed shortcut icon windows 1220 may be located at an area contacting the boundary of the touch screen 190 and an area within the touch screen 190. Positions of the changed shortcut icon windows 1220 are not limited thereto and changed shortcut icon windows 1220*a* and 1220*b* may be located at the status bar 192 of the touch screen 190 and a display area of home screen shortcut icons 191. The changed shortcut icon window 1220 may have any shape, such as a picture, a text, a character, a figure or the like.

The changed shortcut icon window 1220*b* located at the area contacting the boundary of the touch screen 190 may have a shape including a text which can express a category of a plurality of shortcut icons included in the shortcut icon window before the shape is changed as well as the above described shapes.

Figure 18A:
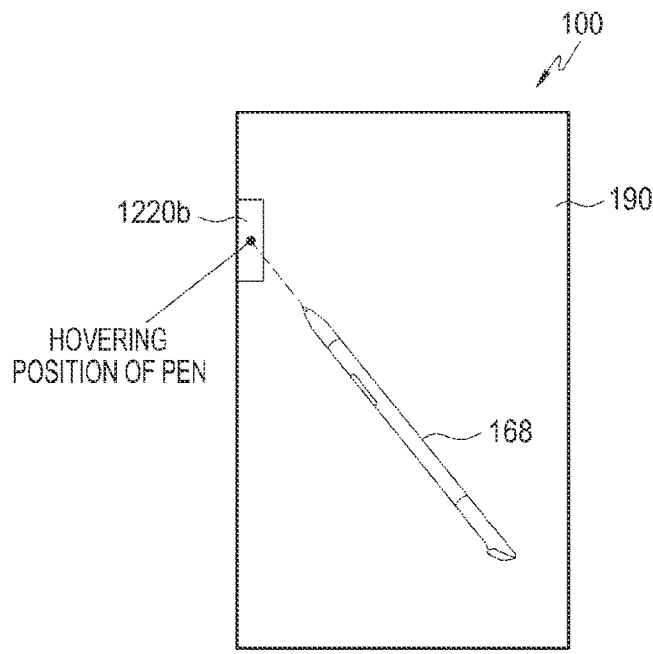
FIGS. 18A and 18B illustrate an example of a process in which, when a hovering event is generated in a changed shortcut icon window, a shortcut icon window before the change is also displayed according to the present disclosure.
Figure 18B:
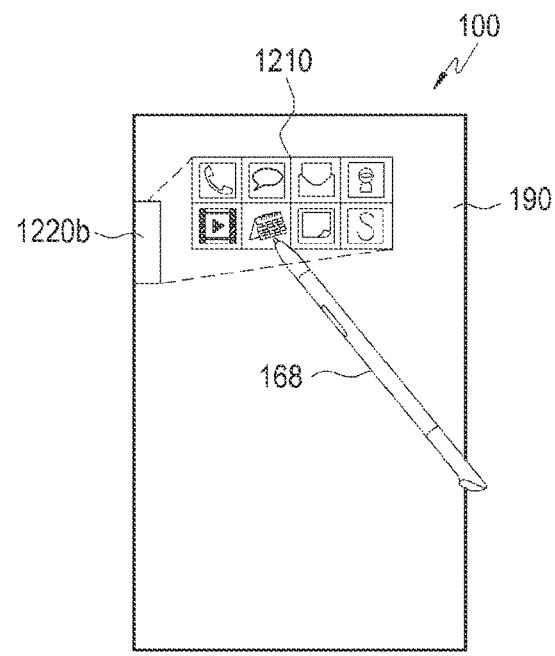

FIGS. 18A and 18B illustrate an example of a process in which, when a hovering event is generated in the changed shortcut icon window, the shortcut icon window before the change is also displayed according to the present disclosure.

When a hovering event (for example, a hovering event through the stylus pen 168) is generated in an area where the changed shortcut icon window 1220*b* displayed on the touch screen 190 is located, the mobile device 100 displays the shortcut icon window 1210 before the change on the touch screen 190 in a popup form or a list form and then waits to receive a next user input.

When the mobile device 100 receives a user input of selecting a shortcut icon included in the shortcut icon window 1210, the mobile device 100 may execute an application corresponding to the shortcut icon.

Figure 19A:
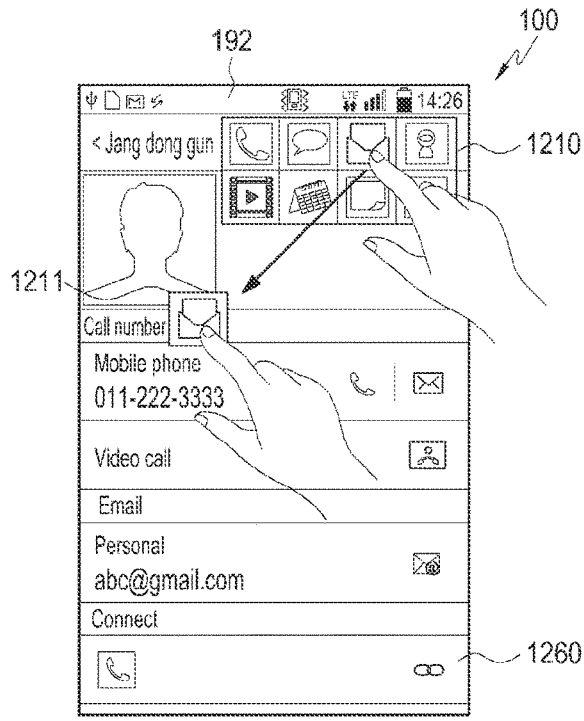
FIGS. 19A, 19B, and 19C illustrate an example of sharing data between an application corresponding to a shortcut icon included in a shortcut icon window and an application being currently executed according to the present disclosure.
Figure 19B:
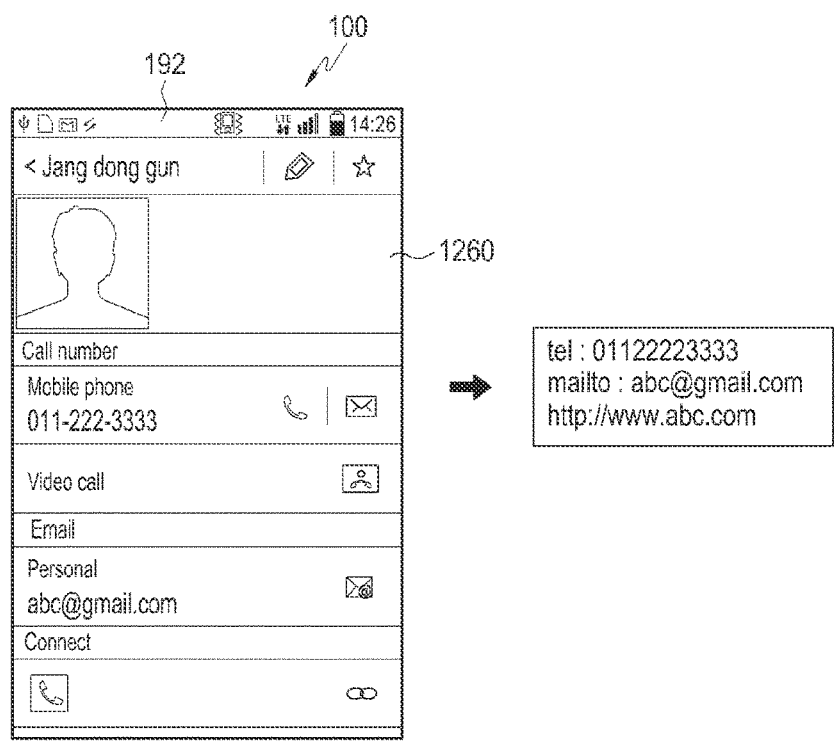
Figure 19C:
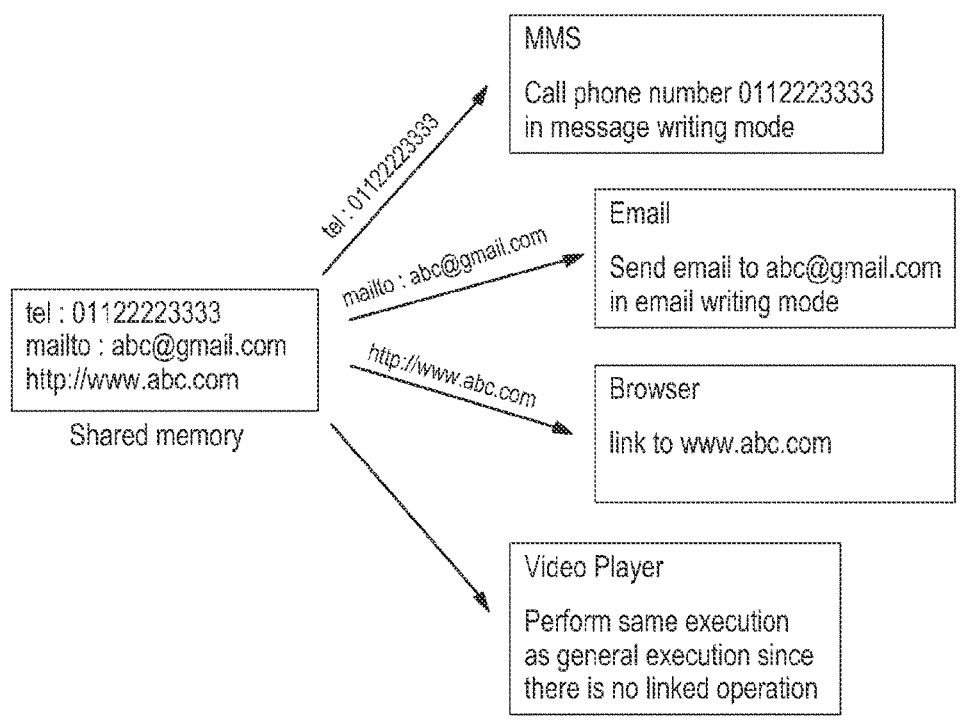

FIGS. 19A, 19B, and 19C illustrate an example of sharing data between an application corresponding to a shortcut icon included in the shortcut icon window and an application being currently executed according to the present disclosure.

FIG. 19A illustrates an example of a process of dragging and dropping one of the shortcut icons included in the shortcut icon window displayed on the second layer of the touch screen to the outside of the boundary of the shortcut icon window while an application is executed in the mobile device according to an embodiment of the present disclosure, FIG. 19B illustrates an example of a process of storing data which can be shared between applications in a storage space when the mobile device executes the application according to an embodiment of the present disclosure, and FIG. 19C illustrates an example of formats of data which can be shared between applications in the mobile device according to an embodiment of the present disclosure.

When one shortcut icon 1211 included in the shortcut icon window 1210 is dragged and dropped to the outside of the boundary of the corresponding shortcut icon window 1210 while an application is executed, the mobile device 100 terminates displaying the application being currently executed as indicated by a reference numeral 1260 and executes an application corresponding to the dragged and dropped shortcut icon. In this case, the mobile device 100 may pre-store data which can be shared between the application being executed and other applications in a storage space, extract data which can be used for the application corresponding to the shortcut icon from the stored shared data, and reflect the data when the application corresponding to the shortcut icon is executed. For example, when the mobile device 100 is executing a phone book related application, the mobile device 100 may pre-store shared data including information on a phone number, an e-mail address, and a website address in the storage space. Thereafter, when one shortcut icon 1211 of the shortcut icons included in the shortcut icon window 1210 is dragged and dropped to the outside of the boundary of the corresponding shortcut icon window 1210, the application corresponding to the corresponding shortcut icon is executed by reflecting the data which can be used among the pre-stored shared data. The reflected shared data varies depending on an application being executed as illustrated in FIG. 19C. When the mobile device 100 is executing the phone book related application, the mobile device 100 may store the shared data including the information on the phone number, the e-mail address, and the website address. When a Multimedia Messaging Service (MMS) related shortcut icon is dragged and dropped from the shortcut icon window and executed, the mobile device 100 may execute an application corresponding to the MMS related shortcut icon by reflecting the phone number, the e-mail address, and the website address.

Furthermore, information on the method of displaying the shortcut icon window may be stored in a computer-readable recording medium. The recording medium includes all types of recording media that store programs and data readable by a computer system. For example, the computer-readable recording medium may include a Read Only Memory (ROM), Random Access Memory (RAM), a Compact Disk (CD), a Digital Video Disk (DVD)-ROM, a magnetic tape, a floppy disk, an optical data storage device, an embedded Multimedia Card (eMMC), and the like, and the recording medium may be distributed to a computer system connected to a network to store and execute a computer-readable code in a distribution manner.

According to the present disclosure, the user can execute and use a corresponding application by more easily selecting a shortcut icon and the user can more simply and conveniently use an application by displaying a shortcut icon window including a plurality of shortcut icons on the second layer of the touch screen of the mobile device.

Further, the user can use a shortcut icon corresponding to a desired application by displaying a shortcut icon window even while an application is being executed. Accordingly, it is possible to conveniently control applications.

Methods according to the embodiments of the present disclosure may be implemented in a form of program commands executed through various computer means and stored in a computer-readable medium. The computer-readable medium may include a program command, a data file, and a data structure alone or a combination thereof. The program instructions recorded in the medium may be specially designed and configured for the present disclosure, or may be known to and usable by those skilled in the field of computer software.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An apparatus for displaying an object container, the apparatus comprising:
a touch screen; and
a controller configured to:
control the touch screen to display a first layer and a second layer including an object container having at least one object, wherein the second layer is located on the first layer;
when a first user gesture on the object container is input:
determine a side at which the object container is to be moved on the touch screen based on at least one position at which a final touch of the first user gesture ends,
change a shape of the object container for displaying on the determined side of the touch screen, and
display the changed object container on the determined side of the touch screen; and
when a second user gesture on the object container is input, split the object container into a plurality of sub object containers in response to the second user gesture,
wherein the second user gesture includes selecting a plurality of touch locations within the object container and moving the selected plurality of touch locations apart from each other, and
wherein a number of the sub object containers is equal to a number of the selected plurality of touch locations.

2. The apparatus of claim 1, wherein, when a third gesture on the changed object container is input, the controller is configured to display the object container before the change.

3. The apparatus of claim 1 wherein, when the at least one of the object is selected, the controller is configured to display the changed object container on an execution screen of an application corresponding to the selected at least one object.

4. The apparatus of claim 1, wherein the changed object container is smaller than the object container before the change.

5. The apparatus of claim 1, wherein the touch screen is configured to receive a user gesture.

6. The apparatus of claim 1, wherein the controller is configured to display a plurality of object containers on the touch screen, and each of the plurality of object containers has at least one object.

7. The apparatus of claim 1, wherein the controller is configured to display a plurality of object containers on the touch screen, each of the plurality of object containers including at least one object, and the controller is configured to combine the plurality of object containers into one by a fourth user gesture input into the apparatus.

8. A method of displaying an object container, the method comprising:
displaying a first layer and a second layer including an object container having at least one object on a touch screen, the second layer being located on the first layer;
when a first user gesture on the object container is input:
determining a side at which the object container is to be moved on the touch screen based on at least one a position at which a final touch of the first user gesture ends,
changing shape of the object container for displaying on the determined side of the touch screen, and
displaying the changed object container on the determined side of the touch screen; and
when a second user gesture on the object container is input, splitting the object container into a plurality of sub object containers in response to the second user gesture input,
wherein the second user gesture includes selecting a plurality of touch locations within the object container and moving the selected plurality of touch locations apart from each other, and
wherein a number of the sub object containers is equal to a number of the selected plurality of touch locations.

9. The method of claim 8, further comprising, when a third gesture on the changed object container is input, displaying the object container before the change.

10. The method of claim 8, wherein, when at least one of the object is selected, the changed object container is displayed on a execution screen of a application corresponding to the selected at least one object.

11. The method of claim 8, further comprising, the changed object container is smaller than the object container before the change.

12. The method of claim 8, wherein the touch screen is configured to receive a user gesture.

13. The method of claim 8, wherein a plurality of object containers are displayed on the touch screen, and each of the plurality of object containers has at least one object.

14. The method of claim 8, wherein a plurality of object containers are displayed on the touch screen, each of the plurality of object containers including at least one object.

15. The method of claim 14, further comprises combining the plurality of object containers into one by a fourth user gesture input from an input means.

16. A non-transitory computer-readable recording medium having a program recorded thereon, which when executed, performs a method of displaying a object container, the method comprising the steps of:

displaying a first layer and a second layer including a object container having at least one object on a touch screen, the second layer being located on the first layer;

when a first user gesture on the object container is input:

determining a side at which the object container is to be moved on the touch screen based on at least one a position at which a final touch of the first user gesture ends, changing shape of the object container for displaying on the determined side of the touch screen, and displaying the changed object container on the determined side of the touch screen; and when a second user gesture on the object container is input, splitting the object container into a plurality of sub object containers in response to the second user gesture input, wherein the second user gesture includes selecting a plurality of touch locations within the object container and moving the selected plurality of touch locations apart from each other, and wherein a number of the sub object containers is equal to a number of the selected plurality of touch locations.

\* \* \* \* \*